US012601279B2

(12) United States Patent
Foxall et al.

(10) Patent No.: US 12,601,279 B2
(45) Date of Patent: Apr. 14, 2026

(54) INSERTION TOOL AND METHOD

(71) Applicants: General Electric Company, Schenectady, NY (US); Oliver Crispin Robotics Limited, Altrincham (GB)

(72) Inventors: Julian Matthew Foxall, Bristol (GB); Trevor Owen Hawke, Bristol (GB); Andrew Crispin Graham, Badminton (GB); Chiara Mellucci, Bristol (GB); Todd William Danko, Niskayuna, NY (US); Ambarish Jayant Kulkarni, Glenville, NY (US); Michael Dean Fullington, West Chester, OH (US); Margeaux Wallace, Niskayuna, NY (US)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 18/649,333

(22) Filed: Apr. 29, 2024

(65) Prior Publication Data

US 2024/0280033 A1 Aug. 22, 2024

Related U.S. Application Data

(63) Continuation of application No. 16/898,629, filed on Jun. 11, 2020, now Pat. No. 12,091,981.

(51) Int. Cl.
*F01D 21/00* (2006.01)
*F01D 25/28* (2006.01)

(52) U.S. Cl.
CPC ........... *F01D 21/003* (2013.01); *F01D 25/28* (2013.01); *F05D 2220/323* (2013.01);
(Continued)

(58) Field of Classification Search
CPC ........ F01D 21/003; F01D 5/005; F01D 25/28; F05D 2270/8041; F05D 2220/323;
(Continued)

(56) References Cited

U.S. PATENT DOCUMENTS

| | | | |
|---|---|---|---|
| 338,310 | A | 3/1886 | Smith |
| 1,774,986 | A | 9/1930 | Mackenzie |

(Continued)

FOREIGN PATENT DOCUMENTS

| | | | |
|---|---|---|---|
| CA | 2960352 | A1 | 9/2017 |
| CA | 3077622 | A1 | 4/2019 |

(Continued)

OTHER PUBLICATIONS

U.S. Appl. No. 17/144,487; Final Rejection mailed Sep. 18, 2024; (pp. 1-14).

(Continued)

*Primary Examiner* — Nathaniel E Wiehe
*Assistant Examiner* — Maxime M Adjagbe
(74) *Attorney, Agent, or Firm* — Fitch, Even, Tabin & Flannery LLP

(57) ABSTRACT

An insertion tool is provided for an engine defining an access opening and including a component defining at least in part a cavity. The insertion tool includes: an insertion tool arm having a plurality of segments, the insertion tool arm configured for insertion through the access opening into the cavity and the plurality of segments configured to be in a fixed position relative to one another within the cavity; and a base coupled to the insertion tool arm and configured to be positioned outside the cavity and to move the insertion tool arm along at least two degrees of freedom.

20 Claims, 7 Drawing Sheets

(52) U.S. Cl.
CPC ...... *F05D 2230/72* (2013.01); *F05D 2230/80* (2013.01); *F05D 2250/42* (2013.01); *F05D 2260/80* (2013.01)

(58) Field of Classification Search
CPC ............. F05D 2230/70; F05D 2230/80; F23R 2900/00019; G01N 2223/63; G01B 5/20; G01B 5/201; G01B 5/205; G01B 5/213; G01M 15/14
See application file for complete search history.

(56) References Cited

U.S. PATENT DOCUMENTS

| | | | |
|---|---|---|---|
| 1,987,972 | A | 1/1935 | Rhein |
| 2,073,903 | A | 3/1937 | O'Neil |
| 2,510,198 | A | 6/1950 | Tesmer |
| 2,974,676 | A | 3/1961 | Hagelthorn |
| 3,096,962 | A | 7/1963 | Meijs |
| 3,190,286 | A | 6/1965 | Stokes |
| 3,266,059 | A | 8/1966 | Stelle |
| 3,270,641 | A | 9/1966 | Gosselin |
| 3,583,393 | A | 6/1971 | Takahashi |
| 3,625,084 | A | 12/1971 | Siebert |
| 3,778,170 | A | 12/1973 | Howell |
| 4,035,137 | A | 7/1977 | Arand |
| 4,041,695 | A | 8/1977 | Harper |
| 4,095,418 | A | 6/1978 | Mansson |
| 4,170,489 | A | 10/1979 | Magnus |
| 4,215,979 | A | 8/1980 | Morishita |
| 4,227,584 | A | 10/1980 | Driver |
| 4,242,863 | A | 1/1981 | Bailey |
| 4,483,326 | A | 11/1984 | Yamaka |
| 4,625,936 | A | 12/1986 | Hadden, Sr. |
| 4,651,718 | A | 3/1987 | Collins |
| 4,655,673 | A | 4/1987 | Hawkes |
| 4,696,544 | A | 9/1987 | Costella |
| 4,703,888 | A | 11/1987 | Kawamura |
| 4,713,120 | A | 12/1987 | Hodgens, II |
| 4,714,339 | A | 12/1987 | Lau |
| 4,730,960 | A | 3/1988 | Lewis |
| 4,735,501 | A | 4/1988 | Ginsburgh |
| 4,757,258 | A | 7/1988 | Kelly, Jr. |
| 4,773,395 | A | 9/1988 | Suzuki |
| 4,790,294 | A | 12/1988 | Allred, III |
| 4,790,624 | A | 12/1988 | Van Hoye |
| 4,826,087 | A | 5/1989 | Chinery |
| 4,846,573 | A | 7/1989 | Taylor |
| 4,890,602 | A | 1/1990 | Hake |
| 4,911,206 | A | 3/1990 | Gropp |
| 4,972,048 | A | 11/1990 | Martin |
| 4,991,565 | A | 2/1991 | Takahashi |
| 5,090,205 | A | 2/1992 | Foster |
| 5,102,221 | A | 4/1992 | Desgranges |
| 5,164,826 | A | 11/1992 | Dailey |
| 5,203,646 | A | 4/1993 | Landsberger |
| 5,254,809 | A | 10/1993 | Martin |
| 5,271,382 | A | 12/1993 | Chikama |
| 5,323,962 | A | 6/1994 | Jassby |
| 5,337,733 | A | 8/1994 | Bauerfeind |
| 5,339,845 | A | 8/1994 | Huddas |
| 5,372,162 | A | 12/1994 | Frey |
| 5,385,102 | A | 1/1995 | Villedieu |
| 5,390,402 | A | 2/1995 | White |
| 5,399,164 | A | 3/1995 | Snoke |
| 5,408,970 | A | 4/1995 | Burkhard |
| 5,482,029 | A | 1/1996 | Sekiguchi |
| 5,501,156 | A | 3/1996 | Richter |
| 5,558,665 | A | 9/1996 | Kieturakis |
| 5,644,394 | A | 7/1997 | Owens |
| 5,667,023 | A | 9/1997 | Harrell |
| 5,755,731 | A | 5/1998 | Grinberg |
| 5,787,897 | A | 8/1998 | Kieturakis |
| 5,807,241 | A | 9/1998 | Heimberger |
| 5,816,769 | A | 10/1998 | Bauer |
| 5,842,381 | A | 12/1998 | Feiten |
| 6,123,273 | A | 9/2000 | Loprinzo |
| 6,156,974 | A | 12/2000 | Blase |
| 6,213,974 | B1 | 4/2001 | Smith |
| 6,216,439 | B1 | 4/2001 | Nakamoto |
| 6,287,206 | B1 | 9/2001 | Stage |
| 6,311,704 | B1 | 11/2001 | Foster |
| 6,371,148 | B1 | 4/2002 | Tripp |
| 6,431,824 | B2 | 8/2002 | Schotsch |
| 6,432,046 | B1 | 8/2002 | Yarush |
| 6,478,033 | B1 | 11/2002 | Foster |
| 6,481,195 | B1 | 11/2002 | Blase |
| 6,542,230 | B1 | 4/2003 | Luke |
| 6,643,877 | B1 | 11/2003 | Amtenbrink |
| 6,698,456 | B2 | 3/2004 | Neubauer |
| 6,783,491 | B2 | 8/2004 | Saadat |
| 6,800,016 | B2 | 10/2004 | Wittenberg |
| 6,837,846 | B2 | 1/2005 | Jaffe |
| 6,941,974 | B2 | 9/2005 | Utaki |
| 6,943,570 | B2 | 9/2005 | Duffy |
| 6,955,023 | B2 | 10/2005 | Rotheroe |
| 6,957,781 | B2 | 10/2005 | Gowens |
| 6,974,411 | B2 | 12/2005 | Belson |
| 7,033,979 | B2 | 4/2006 | Herwig |
| 7,150,416 | B2 | 12/2006 | Martin |
| 7,171,279 | B2 | 1/2007 | Buckingham |
| 7,182,024 | B2 | 2/2007 | Pfeiffer |
| 7,182,025 | B2 | 2/2007 | Ghorbel |
| 7,185,407 | B2 | 3/2007 | Boyl-Davis |
| 7,258,521 | B2 | 8/2007 | Guerra |
| 7,509,735 | B2 | 3/2009 | Philip |
| 7,543,518 | B2 | 6/2009 | Buckingham |
| 7,559,340 | B2 | 7/2009 | Ikeda |
| 7,571,735 | B2 | 8/2009 | Wagner |
| 7,654,143 | B2 | 2/2010 | Roney |
| 7,662,091 | B2 | 2/2010 | Bagley |
| 7,677,181 | B2 | 3/2010 | Boyl-Davis |
| 7,703,272 | B2 | 4/2010 | Wagner |
| 7,707,704 | B2 | 5/2010 | Crocker |
| 7,712,301 | B1 | 5/2010 | Wagner |
| 7,718,894 | B2 | 5/2010 | Blase |
| 7,741,563 | B2 | 6/2010 | Harada |
| 7,849,878 | B2 | 12/2010 | Kohler |
| 7,854,109 | B2 | 12/2010 | Zubiate |
| 7,883,674 | B2 | 2/2011 | Huang |
| 8,028,936 | B2 | 10/2011 | Mcdermott |
| 8,069,747 | B2 | 12/2011 | Buckingham |
| 8,096,030 | B2 | 1/2012 | Graichen |
| 8,100,031 | B2 | 1/2012 | Zubiate |
| 8,125,755 | B2 | 2/2012 | Garcia |
| 8,152,934 | B2 | 4/2012 | Lee |
| 8,190,294 | B2 | 5/2012 | Sjoestrand |
| 8,205,522 | B2 | 6/2012 | Buckingham |
| 8,206,488 | B2 | 6/2012 | Mantkowski |
| 8,277,647 | B2 | 10/2012 | Rice |
| 8,299,785 | B2 | 10/2012 | Bousquet |
| 8,303,243 | B2 | 11/2012 | Fish |
| 8,327,518 | B2 | 12/2012 | Eberhard |
| 8,374,722 | B2 | 2/2013 | Buckingham |
| 8,377,232 | B2 | 2/2013 | Myers |
| 8,395,300 | B2 | 3/2013 | Aabloo |
| 8,400,501 | B2 | 3/2013 | Heyworth |
| 8,409,248 | B2 | 4/2013 | Ginn |
| 8,453,533 | B2 | 6/2013 | Ryland |
| 8,505,204 | B2 | 8/2013 | Reverchon |
| 8,571,711 | B2 | 10/2013 | Jacobsen |
| 8,635,849 | B2 | 1/2014 | Tassone |
| 8,640,531 | B2 | 2/2014 | Remillard |
| 8,674,222 | B2 | 3/2014 | Hsieh |
| 8,714,038 | B2 | 5/2014 | Moran |
| 8,758,232 | B2 | 6/2014 | Graham |
| 8,786,848 | B2 | 7/2014 | Hatcher |
| 8,833,826 | B2 | 9/2014 | Garcia |
| 8,893,749 | B2 | 11/2014 | Perry |
| 8,920,579 | B2 | 12/2014 | Liedtke |
| 8,945,096 | B2 | 2/2015 | Zubiate |
| 8,959,902 | B2 | 2/2015 | Olivier |
| 8,991,163 | B2 | 3/2015 | Olivier |
| 8,992,421 | B2 | 3/2015 | Stand |
| 8,998,567 | B2 | 4/2015 | Scipio |

(56) References Cited

U.S. PATENT DOCUMENTS

| | | | |
|---|---|---|---|
| 9,016,159 | B2 | 4/2015 | Kell |
| 9,016,293 | B2 | 4/2015 | Battaglioli |
| 9,028,618 | B2 | 5/2015 | Battaglioli |
| 9,127,234 | B2 | 9/2015 | Hughes |
| 9,138,782 | B2 | 9/2015 | Dorshimer |
| 9,149,929 | B2 | 10/2015 | Motzer |
| 9,187,700 | B2 | 11/2015 | Huang |
| 9,220,398 | B2 | 12/2015 | Woodley |
| 9,263,866 | B2 | 2/2016 | Shimizu |
| 9,272,425 | B2 | 3/2016 | Garcia |
| 9,294,737 | B2 | 3/2016 | Hatcher, Jr. |
| 9,300,926 | B2 | 3/2016 | Kell |
| 9,329,377 | B2 | 5/2016 | Kell |
| 9,389,150 | B2 | 7/2016 | Kimpel, Jr. |
| 9,399,299 | B2 | 7/2016 | Hermey |
| 9,403,244 | B2 | 8/2016 | Rautenberg |
| 9,409,292 | B2 | 8/2016 | Smith |
| 9,435,750 | B2 | 9/2016 | Matsumoto |
| 9,458,735 | B1 | 10/2016 | Diwinsky |
| 9,492,906 | B2 | 11/2016 | Jürgen |
| 9,505,125 | B2 | 11/2016 | Zubiate |
| 9,549,663 | B2 | 1/2017 | Larkin |
| 9,581,440 | B2 | 2/2017 | Ruhge |
| 9,726,628 | B2 | 8/2017 | Ruhge |
| 9,733,195 | B2 | 8/2017 | Colletti |
| 9,739,168 | B2 | 8/2017 | Ekanayake |
| 9,778,141 | B2 | 10/2017 | Bancalari |
| 9,788,141 | B2 | 10/2017 | Ponec |
| 9,857,002 | B2 | 1/2018 | Ott |
| 9,902,024 | B2 | 2/2018 | Ernst |
| 9,909,694 | B2 | 3/2018 | Graham |
| 9,926,517 | B2 | 3/2018 | Tibbetts |
| 9,932,854 | B1 | 4/2018 | Tibbetts |
| 9,951,647 | B2 | 4/2018 | Rawson |
| 9,957,066 | B2 | 5/2018 | Bewlay |
| 10,005,111 | B2 | 6/2018 | Eriksen |
| 10,018,113 | B2 | 7/2018 | Bewlay |
| 10,060,569 | B2 | 8/2018 | Sivacoe |
| 10,085,624 | B2 | 10/2018 | Isoda |
| 10,197,473 | B2 | 2/2019 | Diwinsky |
| 10,213,919 | B2 | 2/2019 | Axinte |
| 10,227,891 | B2 | 3/2019 | Eriksen |
| 10,238,457 | B2 | 3/2019 | Herrell |
| 10,265,810 | B2 | 4/2019 | Diwinsky |
| 10,323,539 | B2 | 6/2019 | Bewlay |
| 10,377,968 | B2 | 8/2019 | Brooks |
| 10,385,723 | B2 | 8/2019 | Flynn |
| 10,428,993 | B2 | 10/2019 | Whitefield |
| 10,470,831 | B2 | 11/2019 | Cohen |
| 10,488,349 | B2 | 11/2019 | Sibbach |
| 10,618,162 | B2 | 4/2020 | Norton |
| 10,634,004 | B2 | 4/2020 | Giljohann |
| 10,639,805 | B2 | 5/2020 | Saraliev |
| 10,669,885 | B2 | 6/2020 | Pecchiol |
| 10,775,315 | B2 | 9/2020 | Mekala |
| 10,884,232 | B1 | 1/2021 | Trivedi |
| 10,920,181 | B2 | 2/2021 | Martin |
| 10,926,403 | B1 | 2/2021 | Asokan |
| 10,962,345 | B2 | 3/2021 | Graham |
| 10,967,504 | B2 | 4/2021 | Simaan |
| 11,027,317 | B2 | 6/2021 | Tibbetts |
| 11,371,437 | B2 | 6/2022 | Hawke |
| 11,413,763 | B2 | 8/2022 | Lee |
| 11,419,692 | B2 | 8/2022 | Kim |
| 11,441,446 | B2 | 9/2022 | Rawson |
| 11,518,048 | B2 | 12/2022 | Saraliev |
| 11,613,003 | B2 | 3/2023 | Graham |
| 11,692,650 | B2 | 7/2023 | Graham |
| 11,707,819 | B2 | 7/2023 | Graham |
| 11,752,622 | B2 | 9/2023 | Graham |
| 11,787,069 | B2 | 10/2023 | Curle |
| 11,793,536 | B2 | 10/2023 | Walen |
| 12,091,981 | B2 | 9/2024 | Foxall |
| 12,194,620 | B2 | 1/2025 | Graham |
| 12,318,801 | B2 | 6/2025 | Kulkarni |
| 12,405,187 | B2 | 9/2025 | Trivedi |
| 12,416,800 | B2 | 9/2025 | Trivedi |
| 2002/0091027 | A1 | 7/2002 | Scheufele |
| 2003/0089267 | A1 | 5/2003 | Ghorbel |
| 2003/0171736 | A1 | 9/2003 | Bon |
| 2003/0229420 | A1 | 12/2003 | Buckingham |
| 2004/0059191 | A1 | 3/2004 | Krupa |
| 2004/0138525 | A1 | 7/2004 | Saadat |
| 2004/0186350 | A1 | 9/2004 | Brenneman |
| 2004/0193016 | A1 | 9/2004 | Root |
| 2004/0249367 | A1 | 12/2004 | Saadat |
| 2004/0255422 | A1 | 12/2004 | Reback |
| 2005/0075538 | A1 | 4/2005 | Banik |
| 2005/0107667 | A1 | 5/2005 | Danitz |
| 2005/0124856 | A1 | 6/2005 | Fujikura |
| 2005/0148287 | A1 | 7/2005 | Moeller |
| 2005/0203340 | A1 | 9/2005 | Butler |
| 2005/0204489 | A1 | 9/2005 | Velez, Jr. |
| 2005/0273085 | A1 | 12/2005 | Hinman |
| 2006/0073348 | A1 | 4/2006 | Farmer |
| 2006/0074283 | A1 | 4/2006 | Henderson |
| 2006/0074383 | A1 | 4/2006 | Boulais |
| 2006/0131908 | A1 | 6/2006 | Tadano |
| 2006/0156851 | A1 | 7/2006 | Jacobsen |
| 2006/0170386 | A1 | 8/2006 | Anhalt |
| 2006/0258265 | A1 | 11/2006 | Moeller |
| 2008/0066821 | A1 | 3/2008 | Komiya |
| 2008/0149141 | A1 | 6/2008 | Sales |
| 2008/0161971 | A1 | 7/2008 | Buckingham |
| 2008/0199304 | A1 | 8/2008 | Moran |
| 2008/0218728 | A1 | 9/2008 | Kirschner |
| 2008/0250769 | A1 | 10/2008 | Wagner |
| 2009/0084108 | A1 | 4/2009 | Prociw |
| 2009/0084408 | A1 | 4/2009 | Thiemann |
| 2009/0084411 | A1 | 4/2009 | Woodcock |
| 2009/0086014 | A1 | 4/2009 | Lea |
| 2009/0132085 | A1 | 5/2009 | Sjostrand |
| 2009/0216245 | A1 | 8/2009 | Viola |
| 2009/0216374 | A1 | 8/2009 | Low |
| 2009/0255102 | A1 | 10/2009 | Mcmasters |
| 2009/0255116 | A1 | 10/2009 | Mcmasters |
| 2009/0256007 | A1 | 10/2009 | Mcmasters |
| 2009/0320891 | A1 | 12/2009 | Liedtke |
| 2010/0030377 | A1 | 2/2010 | Unsworth |
| 2010/0037924 | A1 | 2/2010 | Gebhardt |
| 2010/0108107 | A1 | 5/2010 | Mantkowski |
| 2010/0108377 | A1 | 5/2010 | Terada |
| 2010/0116292 | A1 | 5/2010 | Wagner |
| 2010/0147330 | A1 | 6/2010 | Kohler |
| 2010/0160736 | A1 | 6/2010 | Padget |
| 2010/0234988 | A1 | 9/2010 | Buckingham |
| 2010/0256447 | A1 | 10/2010 | Dubi |
| 2010/0275404 | A1 | 11/2010 | Myers |
| 2011/0030381 | A1 | 2/2011 | Sordyl |
| 2011/0112527 | A1 | 5/2011 | Hamilton, Jr. |
| 2011/0152879 | A1 | 6/2011 | Williams |
| 2011/0174108 | A1 | 7/2011 | Graham |
| 2011/0295427 | A1 | 12/2011 | Motzer |
| 2011/0303053 | A1 | 12/2011 | Schneider |
| 2011/0313243 | A1 | 12/2011 | Zubiate |
| 2012/0067158 | A1 | 3/2012 | Kell |
| 2012/0125164 | A1 | 5/2012 | Kozak |
| 2012/0167547 | A1 | 7/2012 | Zhang |
| 2012/0184817 | A1 | 7/2012 | Sugiyama |
| 2012/0197241 | A1 | 8/2012 | Golden |
| 2012/0253276 | A1 | 10/2012 | Govari |
| 2012/0260497 | A1 | 10/2012 | White |
| 2012/0279323 | A1 | 11/2012 | Broda |
| 2012/0312103 | A1 | 12/2012 | Hannott |
| 2013/0074879 | A1 | 3/2013 | Battaglioli |
| 2013/0125753 | A1 | 5/2013 | Ono |
| 2013/0192353 | A1 | 8/2013 | Hatcher |
| 2013/0199040 | A1 | 8/2013 | Dudeck |
| 2013/0226033 | A1 | 8/2013 | Eskuri |
| 2013/0255410 | A1 | 10/2013 | Lee |
| 2013/0335530 | A1 | 12/2013 | Hatcher, Jr. |
| 2013/0340559 | A1 | 12/2013 | Danitz |
| 2014/0005683 | A1 | 1/2014 | Stand |
| 2014/0012288 | A1 | 1/2014 | Darisse |

(56) References Cited

U.S. PATENT DOCUMENTS

| | | | |
|---|---|---|---|
| 2014/0055596 | A1 | 2/2014 | Hatcher, Jr. |
| 2014/0058364 | A1 | 2/2014 | Donhowe |
| 2014/0069460 | A1 | 3/2014 | Kell |
| 2014/0125791 | A1 | 5/2014 | Arellano |
| 2014/0133269 | A1 | 5/2014 | Hansen |
| 2014/0260755 | A1 | 9/2014 | Dong |
| 2014/0371764 | A1 | 12/2014 | Oyola |
| 2015/0032252 | A1 | 1/2015 | Galluzzo |
| 2015/0036150 | A1 | 2/2015 | Kobayashi |
| 2015/0064008 | A1 | 3/2015 | Lewis |
| 2015/0159122 | A1 | 6/2015 | Tibbetts |
| 2015/0159557 | A1 | 6/2015 | Scipio |
| 2015/0202013 | A1 | 7/2015 | Teichtmann |
| 2015/0233263 | A1 | 8/2015 | Battaglioli |
| 2015/0246449 | A1 | 9/2015 | Sakai |
| 2015/0300920 | A1 | 10/2015 | Deascanis |
| 2015/0338353 | A1 | 11/2015 | Bancalari |
| 2015/0341600 | A1 | 11/2015 | Hatcher, Jr. |
| 2015/0360629 | A1 | 12/2015 | Sekino |
| 2016/0000629 | A1 | 1/2016 | Jackson |
| 2016/0008990 | A1 | 1/2016 | Franz |
| 2016/0031078 | A1 | 2/2016 | Kapoor |
| 2016/0032761 | A1 | 2/2016 | Griffiths |
| 2016/0040803 | A1 | 2/2016 | Steeger |
| 2016/0052129 | A1 | 2/2016 | Ekas |
| 2016/0114488 | A1 | 4/2016 | Mascorro Medina |
| 2016/0146036 | A1 | 5/2016 | Richter |
| 2016/0174816 | A1 | 6/2016 | Choset |
| 2016/0175057 | A1 | 6/2016 | Ibach |
| 2016/0182776 | A1 | 6/2016 | Huang |
| 2016/0186602 | A1 | 6/2016 | Saenz |
| 2016/0262840 | A1 | 9/2016 | Zubiate |
| 2016/0339584 | A1 | 11/2016 | Esteban Finck |
| 2017/0023154 | A1 | 1/2017 | Jaeker |
| 2017/0095922 | A1 | 4/2017 | Licht |
| 2017/0100197 | A1 | 4/2017 | Zubiate |
| 2017/0120457 | A1 | 5/2017 | Saraliev |
| 2017/0129110 | A1 | 5/2017 | Ohm |
| 2017/0157719 | A1 | 6/2017 | Diwinsky |
| 2017/0165721 | A1 | 6/2017 | Tibbetts |
| 2017/0167289 | A1 | 6/2017 | Diwinsky |
| 2017/0167290 | A1 | 6/2017 | Kulkarni |
| 2017/0167953 | A1 | 6/2017 | Diwinsky |
| 2017/0175569 | A1 | 6/2017 | Rawson |
| 2017/0176342 | A1* | 6/2017 | Colletti ................ F01D 21/003 |
| 2017/0191376 | A1 | 7/2017 | Eriksen |
| 2017/0204739 | A1 | 7/2017 | Rawson |
| 2017/0219814 | A1 | 8/2017 | Letter |
| 2017/0219815 | A1 | 8/2017 | Letter |
| 2017/0239762 | A1 | 8/2017 | Roberts |
| 2017/0254217 | A1 | 9/2017 | Eriksen |
| 2017/0274484 | A1 | 9/2017 | Roberts |
| 2017/0319048 | A1 | 11/2017 | Ikeda |
| 2017/0328497 | A1 | 11/2017 | Dantin |
| 2017/0359530 | A1 | 12/2017 | Boudin |
| 2017/0361470 | A1 | 12/2017 | Otero Del Real |
| 2018/0058233 | A1* | 3/2018 | Norton ................... F01D 25/24 |
| 2018/0071039 | A1 | 3/2018 | Barnett |
| 2018/0094538 | A1 | 4/2018 | Tibbetts |
| 2018/0119568 | A1 | 5/2018 | Negoescu |
| 2018/0149038 | A1 | 5/2018 | Eriksen |
| 2018/0154515 | A1 | 6/2018 | Norton |
| 2018/0155060 | A1 | 6/2018 | Dauenhauer |
| 2018/0156062 | A1 | 6/2018 | Dede |
| 2018/0156132 | A1 | 6/2018 | Dede |
| 2018/0214220 | A1 | 8/2018 | Kan |
| 2018/0216036 | A1 | 8/2018 | Tibbetts |
| 2018/0231162 | A1 | 8/2018 | Zeng |
| 2018/0237163 | A1 | 8/2018 | Bewlay |
| 2018/0242958 | A1 | 8/2018 | Dayton |
| 2018/0245477 | A1 | 8/2018 | Kulkarni |
| 2018/0258787 | A1 | 9/2018 | Tibbetts |
| 2018/0291803 | A1 | 10/2018 | Belay |
| 2018/0298781 | A1 | 10/2018 | Tibbetts |
| 2018/0313225 | A1 | 11/2018 | Millhaem |
| 2018/0318024 | A1 | 11/2018 | Yoshii |
| 2018/0355751 | A1 | 12/2018 | Tibbetts |
| 2018/0361960 | A1 | 12/2018 | Yamamoto |
| 2019/0022877 | A1 | 1/2019 | Akin |
| 2019/0046010 | A1 | 2/2019 | Tojo |
| 2019/0054638 | A1 | 2/2019 | Norton |
| 2019/0145498 | A1 | 5/2019 | Yoon |
| 2019/0153890 | A1 | 5/2019 | Eriksen |
| 2019/0190190 | A1 | 6/2019 | Bourgeas |
| 2019/0246878 | A1 | 8/2019 | Bodner |
| 2019/0277770 | A1 | 9/2019 | Mekala |
| 2019/0292938 | A1 | 9/2019 | Wang |
| 2019/0308319 | A1 | 10/2019 | Walters |
| 2019/0323378 | A1 | 10/2019 | Tibbetts |
| 2019/0358813 | A1 | 11/2019 | Graham |
| 2019/0358833 | A1 | 11/2019 | Graham |
| 2019/0360794 | A1 | 11/2019 | Graham |
| 2019/0366536 | A1 | 12/2019 | Graham |
| 2019/0383158 | A1 | 12/2019 | Diwinsky |
| 2019/0383161 | A1 | 12/2019 | Graham |
| 2020/0030377 | A1 | 1/2020 | Zaghouani |
| 2020/0113412 | A1 | 4/2020 | Jensen |
| 2020/0114497 | A1 | 4/2020 | Graham |
| 2020/0114505 | A1 | 4/2020 | Kikuchi |
| 2020/0114528 | A1 | 4/2020 | Graham |
| 2020/0182345 | A1 | 6/2020 | Gu |
| 2020/0205908 | A1 | 7/2020 | Julian |
| 2020/0224552 | A1 | 7/2020 | Millhaem |
| 2020/0316789 | A1 | 10/2020 | Sohmshetty |
| 2020/0319119 | A1 | 10/2020 | Peters |
| 2020/0323599 | A1 | 10/2020 | Kim |
| 2020/0359879 | A1 | 11/2020 | Cahill |
| 2020/0405142 | A1 | 12/2020 | Whitaker |
| 2021/0037354 | A1 | 2/2021 | Peterson |
| 2021/0078165 | A1 | 3/2021 | Tang |
| 2021/0102870 | A1 | 4/2021 | Trivedi |
| 2021/0108537 | A1 | 4/2021 | Rigg |
| 2021/0137354 | A1 | 5/2021 | Bob |
| 2021/0223142 | A1 | 7/2021 | Sasaki |
| 2021/0229269 | A1 | 7/2021 | Graham |
| 2021/0229270 | A1 | 7/2021 | Graham |
| 2021/0231239 | A1 | 7/2021 | Graham |
| 2021/0285374 | A1 | 9/2021 | Hawke |
| 2021/0317752 | A1 | 10/2021 | Deja |
| 2021/0388737 | A1 | 12/2021 | Foxall |
| 2022/0221706 | A1 | 7/2022 | Trivedi |
| 2022/0221707 | A1 | 7/2022 | Trivedi |
| 2022/0290608 | A1 | 9/2022 | Hawke |
| 2022/0314430 | A1 | 10/2022 | Graham |
| 2023/0194234 | A1 | 6/2023 | Graham |
| 2024/0011413 | A1 | 1/2024 | Millheam |
| 2024/0326266 | A1 | 10/2024 | Graham |
| 2025/0163824 | A1 | 5/2025 | Diwinsky |
| 2025/0180345 | A1 | 6/2025 | Graham |
| 2025/0347906 | A1 | 11/2025 | Trivedi |

FOREIGN PATENT DOCUMENTS

| | | | |
|---|---|---|---|
| CA | 3043720 | A1 | 11/2019 |
| CN | 86101283 | A | 8/1986 |
| CN | 1162516 | | 10/1997 |
| CN | 1050781 | C | 3/2000 |
| CN | 1656312 | | 8/2005 |
| CN | 1678937 | | 10/2005 |
| CN | 1903517 | | 1/2007 |
| CN | 101048101 | | 10/2007 |
| CN | 101048102 | | 10/2007 |
| CN | 101528111 | A | 9/2009 |
| CN | 101881218 | | 11/2010 |
| CN | 201769177 | | 3/2011 |
| CN | 201800016 | | 4/2011 |
| CN | 102257292 | | 11/2011 |
| CN | 102292013 | A | 12/2011 |
| CN | 102687057 | | 9/2012 |
| CN | 102711585 | | 10/2012 |
| CN | 102729240 | A | 10/2012 |
| CN | 102871636 | | 1/2013 |
| CN | 203370761 | U | 1/2014 |
| CN | 103895012 | A | 7/2014 |

(56) References Cited

FOREIGN PATENT DOCUMENTS

| | | | |
|---|---|---|---|
| CN | 104175325 | | 12/2014 |
| CN | 104582909 | A | 4/2015 |
| CN | 103639156 | B | 7/2015 |
| CN | 104870141 | | 8/2015 |
| CN | 105144514 | | 12/2015 |
| CN | 105377116 | | 3/2016 |
| CN | 105431106 | | 3/2016 |
| CN | 105436127 | A | 3/2016 |
| CN | 105927820 | | 9/2016 |
| CN | 106113019 | | 11/2016 |
| CN | 106163431 | | 11/2016 |
| CN | 106166746 | | 11/2016 |
| CN | 106427289 | A | 2/2017 |
| CN | 106659438 | | 5/2017 |
| CN | 106988798 | | 7/2017 |
| CN | 107205622 | | 9/2017 |
| CN | 107468339 | A | 12/2017 |
| CN | 108356747 | | 8/2018 |
| CN | 108472025 | | 8/2018 |
| CN | 207941781 | | 10/2018 |
| CN | 108890656 | | 11/2018 |
| CN | 108972527 | | 12/2018 |
| CN | 109068938 | | 12/2018 |
| CN | 109476019 | | 3/2019 |
| CN | 109561935 | | 4/2019 |
| CN | 109716194 | | 5/2019 |
| CN | 110001286 | | 7/2019 |
| CN | 110462169 | | 11/2019 |
| CN | 110529254 | | 12/2019 |
| CN | 110757412 | | 2/2020 |
| CN | 111037602 | | 4/2020 |
| CN | 111486008 | | 8/2020 |
| CN | 113146599 | | 7/2021 |
| CN | 113232042 | | 8/2021 |
| DE | 3504824 | | 8/1986 |
| DE | 4102211 | | 8/1991 |
| DE | 29902753 | U | 6/1999 |
| DE | 10160922 | | 5/2003 |
| DE | 102013202616 | A1 | 8/2014 |
| DE | 102015006330 | | 11/2016 |
| DE | 102019002892 | A1 | 10/2020 |
| DE | 102020106508 | | 9/2021 |
| EP | 1216797 | | 6/2002 |
| EP | 1216797 | A1 | 6/2002 |
| EP | 1489269 | A2 | 12/2004 |
| EP | 1574675 | A2 | 9/2005 |
| EP | 2011619 | A2 | 1/2009 |
| EP | 1914010 | A3 | 9/2010 |
| EP | 2237931 | A1 | 10/2010 |
| EP | 2267508 | | 12/2010 |
| EP | 1967295 | B1 | 1/2011 |
| EP | 2320262 | | 5/2011 |
| EP | 2052792 | A3 | 6/2011 |
| EP | 2353739 | A1 | 8/2011 |
| EP | 2375104 | | 10/2011 |
| EP | 2286933 | B1 | 11/2011 |
| EP | 2275648 | B1 | 3/2012 |
| EP | 1903188 | B1 | 5/2013 |
| EP | 2597273 | A2 | 5/2013 |
| EP | 2629655 | | 8/2013 |
| EP | 3061923 | A1 | 8/2016 |
| EP | 3072642 | A2 | 9/2016 |
| EP | 1908928 | B1 | 12/2016 |
| EP | 3153604 | A1 | 4/2017 |
| EP | 3176365 | A1 | 6/2017 |
| EP | 3572632 | A1 | 11/2019 |
| EP | 3879075 | | 9/2021 |
| FR | 2956608 | A1 | 8/2011 |
| FR | 2995996 | A1 | 3/2014 |
| FR | 3082136 | A1 | 12/2019 |
| GB | 779248 | | 7/1957 |
| GB | 1437405 | A | 5/1976 |
| GB | 2199842 | | 7/1988 |
| GB | 2228644 | A | 8/1990 |
| JP | H10146316 | A | 6/1998 |
| JP | 2006184832 | A | 7/2006 |
| JP | 2013510339 | A | 3/2013 |
| MX | 2010013223 | A1 | 12/2010 |
| TW | 201341090 | | 10/2013 |
| WO | 162227 | B | 8/1989 |
| WO | 9116598 | A1 | 10/1991 |
| WO | 9600030 | | 1/1996 |
| WO | 0006336 | A1 | 2/2000 |
| WO | 2007134461 | | 11/2007 |
| WO | 2009081164 | A1 | 7/2009 |
| WO | 2011092891 | | 8/2011 |
| WO | 2012042921 | A1 | 4/2012 |
| WO | 2012054829 | | 4/2012 |
| WO | 2012054829 | A2 | 4/2012 |
| WO | 2016063074 | A2 | 4/2016 |
| WO | 2017221982 | A1 | 12/2017 |
| WO | 2018001967 | A1 | 1/2018 |
| WO | 2019076876 | A1 | 4/2019 |
| WO | 2019097688 | | 5/2019 |
| WO | 2020022474 | A1 | 1/2020 |
| WO | 2020030516 | A1 | 2/2020 |
| WO | 2021040376 | | 3/2021 |
| WO | 2021040376 | A1 | 3/2021 |

OTHER PUBLICATIONS

U.S. Appl. No. 16/577,268; Notice of Allowance and Fees Due (PTOL-85) mailed Sep. 13, 2024; (pp. 1-15).

U.S. Appl. No. 16/577,268; Notice of Allowance and Fees Due (PTOL-85) mailed Nov. 20, 2024; (pp. 1-15).

U.S. Appl. No. 18/328,076; Notice of Allowance and Fees Due (PTOL-85) mailed Dec. 13, 2024; (pp. 1-8).

U.S. Appl. No. 18/328,076; Notice of Allowance and Fees Due (PTOL-85) mailed Dec. 26, 2024; (pp. 1-5).

U.S. Appl. No. 16/696,025; Non-Final Rejection mailed May 7, 2024; (pp. 1-25).

U.S. Appl. No. 17/552,848; Non-Final Rejection mailed Jun. 21, 2024; (pp. 1-38).

U.S. Appl. No. 16/008,475; Final Rejection mailed Nov. 4, 2024; (pp. 1-50).

U.S. Appl. No. 16/577,268; Non-Final Rejection mailed Jun. 10, 2024; (pp. 1-28).

Bakhshi, M et al., Tunnel Segmental Lining Geometry, Tolerance and Measurement, Tunnelling & Trenchless Conference, 2018, 10 pp.

U.S. Appl. No. 17/552,848; Final Rejection mailed Oct. 28, 2024; (pp. 1-23).

U.S. Appl. No. 16/696,025; Non-Final Rejection mailed Jun. 3, 2025; (pp. 1-25).

U.S. Appl. No. 18/733,557, filed Jun. 4, 2024, entitled "Selectively Flexible Extension Tool".

U.S. Appl. No. 16/577,268; Notice of Allowance mailed Sep. 13, 2024; (pp. 1-16).

U.S. Appl. No. 18/328,076; Notice of Allowance and Fees Due (PTOL-85) mailed Feb. 25, 2025; (pp. 1-5).

U.S. Appl. No. 16/696,025; Final Rejection mailed Mar. 18, 2025; (pp. 1-30).

U.S. Appl. No. 18/328,076; Final Rejection mailed Sep. 24, 2024; (pp. 1-12).

U.S. Appl. No. 16/696,025; Non-Final Rejection mailed Jan. 14, 2025; (pp. 1-28).

U.S. Appl. No. 17/144,435; Final Rejection mailed Jan. 24, 2025; (pp. 1-12).

U.S. Appl. No. 17/144,487; Final Rejection mailed Jan. 23, 2025; (pp. 1-18).

U.S. Appl. No. 18/328,076; Notice of Allowance and Fees Due (PTOL-85) mailed Jan. 14, 2025; (pp. 1-5).

U.S. Appl. No. 16/696,025; Final Rejection mailed Aug. 13, 2024; (pp. 1-25).

U.S. Appl. No. 17/144,435; Notice of Allowance mailed Apr. 23, 2025; (pp. 1-7).

U.S. Appl. No. 17/144,435; Notice of Allowance and Fees Due (PTOL-85) mailed Apr. 23, 2025; (pp. 1-7).

(56) References Cited

OTHER PUBLICATIONS

U.S. Appl. No. 17/144,487; Notice of Allowance and Fees Due (PTOL-85) mailed Apr. 30, 2025; (pp. 1-24).
U.S. Appl. No. 16/696,025, filed Nov. 26, 2019.
U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
FET20 (Wireless Borescope, Klein Tools, Jan. 2019) (Year: 2019).
Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.
Mascarenas et al., "A Compliant Mechanism for Inspecting Extremely Confined Spaces" Smart Materials and Structures, vol. No. 26, pp. 1-16, Oct. 26, 2017.
U.S. Appl. No. 15/986,958, filed May 23, 2018.
U.S. Appl. No. 15/812,004, filed Nov. 14, 2017.
U.S. Appl. No. 15/914,469, filed Mar. 7, 2018.
US Final Office Action from U.S. Appl. No. 15/986,958 dated Sep. 9, 2020, 10 pgs.
US Non-Final Office Action from U.S. Appl. No. 15/986,958 dated Apr. 23, 2020,12 pgs.
US Notice of Allowance and Notice of Allowability, dated Nov. 18, 2020, from U.S. Appl. No. 15/986,958, 9 pgs.
U.S. Appl. No. 16/751,802; Non-Final Rejection mailed Feb. 28, 2022; (pp. 1-12).
U.S. Appl. No. 16/750,743; Non-Final Rejection mailed Apr. 27, 2022; (pp. 1-12).
U.S. Appl. No. 16/751,802; Supplemental Notice of Allowance mailed Feb. 27, 2023; (pp. 1-4).
U.S. Appl. No. 16/008,475; Final Rejection mailed Mar. 2, 2023; (pp. 1-21).
U.S. Appl. No. 16/008,475; Final Rejection mailed Aug. 4, 2022; (pp. 1-8).
U.S. Appl. No. 16/008,475; Final Rejection mailed Dec. 15, 2023; (pp. 1-24).
U.S. Appl. No. 16/008,475; Non-Final Rejection mailed Apr. 22, 2024; (pp. 1-33).
U.S. Appl. No. 16/008,475; Non-Final Rejection mailed Jun. 15, 2023; (pp. 1-23).
U.S. Appl. No. 16/008,475; Non-Final Rejection mailed Oct. 21, 2022; (pp. 1-18).
U.S. Appl. No. 16/577,268; Final Rejection mailed Jul. 3, 2023; (pp. 1-26).
U.S. Appl. No. 16/577,268; Non-Final Rejection mailed Jan. 20, 2023; (pp. 1-29).
U.S. Appl. No. 16/577,268; Non-Final Rejection mailed Oct. 19, 2023; (pp. 1-30).
U.S. Appl. No. 16/577,268; Notice of Allowance and Fees Due (PTOL-85) mailed Feb. 26, 2024; (pp. 1-12).
U.S. Appl. No. 16/577,331; Non-Final Rejection mailed Jan. 19, 2022; (pp. 1-8).
U.S. Appl. No. 16/577,331; Notice of Allowance and Fees Due (PTOL-85) mailed Feb. 15, 2023; (pp. 1-5).
U.S. Appl. No. 16/577,331; Notice of Allowance and Fees Due (PTOL-85) mailed May 26, 2023; (pp. 1-5).
U.S. Appl. No. 16/577,331; Notice of Allowance and Fees Due (PTOL-85) mailed Jul. 25, 2022; (pp. 1-5).
U.S. Appl. No. 16/577,331; Notice of Allowance and Fees Due (PTOL-85) mailed Nov. 7, 2022; (pp. 1-5).
U.S. Appl. No. 16/577,331; Notice of Allowance and Fees Due (PTOL-85) mailed Nov. 7, 2022; (pp. 1-16).
U.S. Appl. No. 16/696,025; Final Rejection mailed Sep. 16, 2022; (pp. 1-34).
U.S. Appl. No. 16/696,025; Final Rejection mailed Dec. 28, 2023; (pp. 1-15).
U.S. Appl. No. 16/696,025; Non-Final Rejection mailed Mar. 28, 2023; (pp. 1-29).
U.S. Appl. No. 16/735,191; Non-Final Rejection mailed Aug. 3, 2022; (pp. 1-11).
U.S. Appl. No. 16/735,191; Notice of Allowance and Fees Due (PTOL-85) mailed Mar. 27, 2023; (pp. 1-5).
U.S. Appl. No. 16/735,191; Notice of Allowance and Fees Due (PTOL-85) mailed Dec. 8, 2022; (pp. 1-8).
U.S. Appl. No. 16/750,665; Non-Final Rejection mailed Jul. 20, 2022; (pp. 1-9).
U.S. Appl. No. 16/750,665; Notice of Allowance and Fees Due (PTOL-85) mailed Mar. 24, 2023; (pp. 1-6).
U.S. Appl. No. 16/750,665; Notice of Allowance and Fees Due (PTOL-85) mailed Aug. 7, 2023; (pp. 1-8).
U.S. Appl. No. 16/750,665; Notice of Allowance and Fees Due (PTOL-85) mailed Nov. 17, 2022; (pp. 1-5).
U.S. Appl. No. 16/750,743; Final Rejection mailed Nov. 7, 2022; (pp. 1-13).
U.S. Appl. No. 16/750,743; Final Rejection mailed Nov. 7, 2022; (pp. 1-28).
U.S. Appl. No. 16/750,743; Notice of Allowance and Fees Due (PTOL-85) mailed Jan. 23, 2023; (pp. 1-5).
U.S. Appl. No. 16/750,743; Notice of Allowance and Fees Due (PTOL-85) mailed May 16, 2023; (pp. 1-5).
U.S. Appl. No. 16/751,802; Final Rejection mailed Jul. 28, 2022; (pp. 1-9).
U.S. Appl. No. 16/751,802; Notice of Allowance and Fees Due (PTOL-85) mailed Feb. 6, 2023; (pp. 1-5).
U.S. Appl. No. 16/751,802; Notice of Allowance and Fees Due (PTOL-85) mailed Oct. 19, 2022; (pp. 1-37).
U.S. Appl. No. 16/751,802; Notice of Allowance and Fees Due (PTOL-85) mailed Oct. 19, 2022; (pp. 1-7).
U.S. Appl. No. 16/898,629; Final Office Action mailed Oct. 10, 2023; (pp. 1-12).
U.S. Appl. No. 16/898,629; Final Rejection mailed Feb. 28, 2023; (pp. 1-22).
U.S. Appl. No. 16/898,629; Non-Final Rejection mailed Jun. 7, 2023; (pp. 1-14).
U.S. Appl. No. 16/898,629; Non-Final Rejection mailed Sep. 13, 2022; (pp. 1-14).
U.S. Appl. No. 16/898,629; Notice of Allowance and Fees Due (PTOL-85) mailed Jan. 17, 2024; (pp. 1-7).
U.S. Appl. No. 17/144,435; Non-Final Rejection mailed Mar. 11, 2024; (pp. 1-12).
U.S. Appl. No. 17/144,487; Final Rejection mailed Jan. 11, 2023; (pp. 1-5).
U.S. Appl. No. 17/144,487; Final Rejection mailed Feb. 12, 2024; (pp. 1-5).
U.S. Appl. No. 17/144,487; Final Rejection mailed Jul. 20, 2023; (pp. 1-7).
U.S. Appl. No. 17/144,487; Non-Final Rejection mailed Mar. 22, 2023; (pp. 1-6).
U.S. Appl. No. 17/144,487; Non-Final Rejection mailed Apr. 18, 2024; (pp. 1-12).
U.S. Appl. No. 17/144,487; Non-Final Rejection mailed Aug. 23, 2022; (pp. 1-6).
U.S. Appl. No. 17/144,487; Non-Final Rejection mailed Nov. 1, 2023; (pp. 1-15).
U.S. Appl. No. 17/219,577; Notice of Allowance and Fees Due (PTOL-85) mailed Jan. 4, 2023; (pp. 1-5).
U.S. Appl. No. 17/552,848; Requirement for Restriction/Election mailed Feb. 26, 2024; (pp. 1-8).
U.S. Appl. No. 17/824,691; Notice of Allowance and Fees Due (PTOL-85) mailed Jun. 21, 2023; (pp. 1-9).
U.S. Appl. No. 17/824,691; Notice of Allowance and Fees Due (PTOL-85) mailed Oct. 10, 2023; (pp. 1-8).
U.S. Appl. No. 18/328,076; Non-Final Rejection mailed Feb. 27, 2024; (pp. 1-14).
Wickham et al., High Heat Flux Surface Coke Deposition and Removal Assessment, Technical Paper, Air Force Research Laboratory, Edwards AFB, Jan. 2015, California, 21 Pages.
U.S. Appl. No. 16/696,025; Notice of Allowance and Fees Due (PTOL-85) mailed Jul. 11, 2025; (pp. 1-10).

(56) References Cited

OTHER PUBLICATIONS

U.S. Appl. No. 17/144,435; Notice of Allowance and Fees Due (PTOL-85) mailed Aug. 18, 2025; (pp. 1-5).
U.S. Appl. No. 17/144,487; Notice of Allowance and Fees Due (PTOL-85) mailed Aug. 19, 2025; (pp. 1-10).
U.S. Appl. No. 17/144,435; Notice of Allowance and Fees Due (PTOL-85) mailed Nov. 10, 2025; (pp. 1-2).

* cited by examiner

INSERTION TOOL AND METHOD

CROSS REFERENCE TO RELATED APPLICATION(S)

This application is a continuation of U.S. application Ser. No. 16/898,629, filed on Jun. 11, 2020, entitled, "INSERTION TOOL AND METHOD", which is incorporated herein by reference in its entirety.

FIELD

The present subject matter relates generally to a tool and method for inspecting cavity through an access opening, such as an annular space in a turbine engine through an inspection port.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Within one or more of the sections, at least certain gas turbine engines define an annular opening. Certain of these annular openings may vary in size. An inspection tool for inspecting one or more of these annular openings may be beneficial.

BRIEF DESCRIPTION

Aspects and advantages of the invention will be set forth in part in the following description, or may be obvious from the description, or may be learned through practice of the invention.

In an aspect of the present disclosure, an insertion tool is provided for an engine defining an access opening and including a component defining at least in part a cavity. The insertion tool includes: an insertion tool arm having a plurality of segments, the insertion tool arm configured for insertion through the access opening into the cavity and the plurality of segments configured to be in a fixed position relative to one another within the cavity; and a base coupled to the insertion tool arm and configured to be positioned outside the cavity and to move the insertion tool arm along at least two degrees of freedom.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
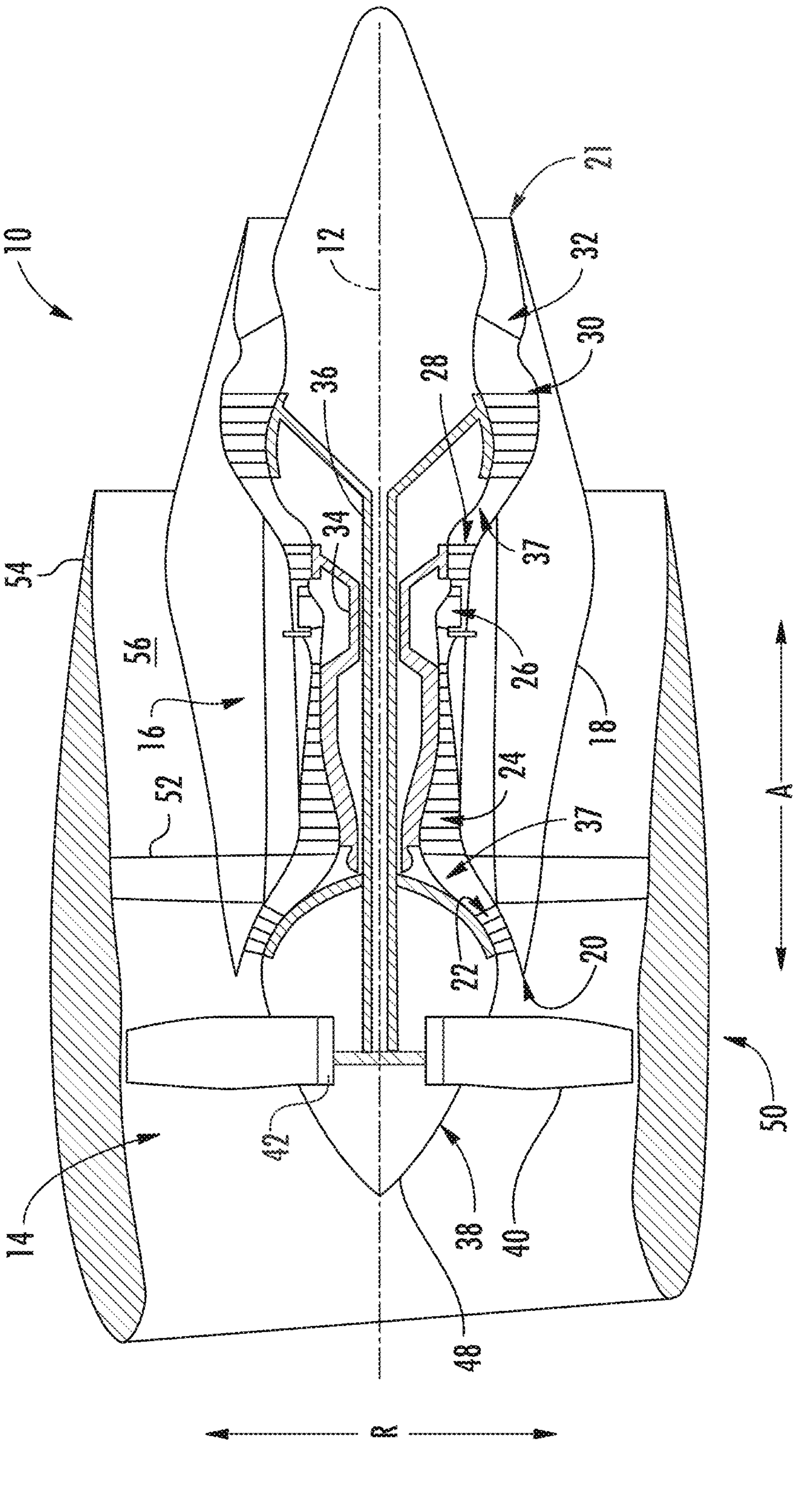
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a gas turbine engine, forward refers to a position closer to an inlet of the gas turbine engine and aft refers to a position closer to an exhaust of the gas turbine engine.

The terms "coupled to," "fixed to," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain gas turbine engines, annular opening(s) are defined, and these annular openings may vary in size within the particular make/model of gas turbine engine, and across different makes/models of gas turbine engines, such that a dedicated, specialized inspection tool must be utilized with each annular opening to extend around and through such annular opening. Maintaining inspection tools for each of the various annular openings may be expensive and inconvenient.

Accordingly, the present disclosure provides for an inspection tool for inspecting annular openings having varying sizes within, e.g., an individual gas turbine engine, or within various gas turbine engines. In particular, certain aspects of the present disclosure provide for an insertion tool that includes: an insertion tool arm having a plurality of segments, and base coupled to the insertion tool arm. The insertion tool arm is configured for insertion through an access opening of the gas turbine engine into a cavity. The plurality of segments are configured to be in a fixed position relative to one another within the cavity. The base is configured to be positioned outside the cavity and is further configured to move the insertion tool arm along at least two degrees of freedom.

In such a manner, it will be appreciated, that the base may be capable of moving an insertion arm that defines a radius of curvature when in the fixed position different than a radius of curvature of the annular opening, allowing for the inspection tool to be utilized with a variety of different-sized annular openings/gas turbine engines.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It will be appreciated that although not depicted in FIG. 1, the turbofan engine 10 may further define a plurality of openings allowing for inspection of various components within the turbomachine 16. For example, the turbofan engine 10 may define a plurality of borescope openings at various axial positions within the compressor section, combustion section 26, and turbine section. Additionally, as will be discussed below, the turbofan engine 10 may include one or more igniter ports within, e.g., the combustion section 26 of the turbomachine 16, that may allow for inspection of the combustion section 26.

It should further be appreciated that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
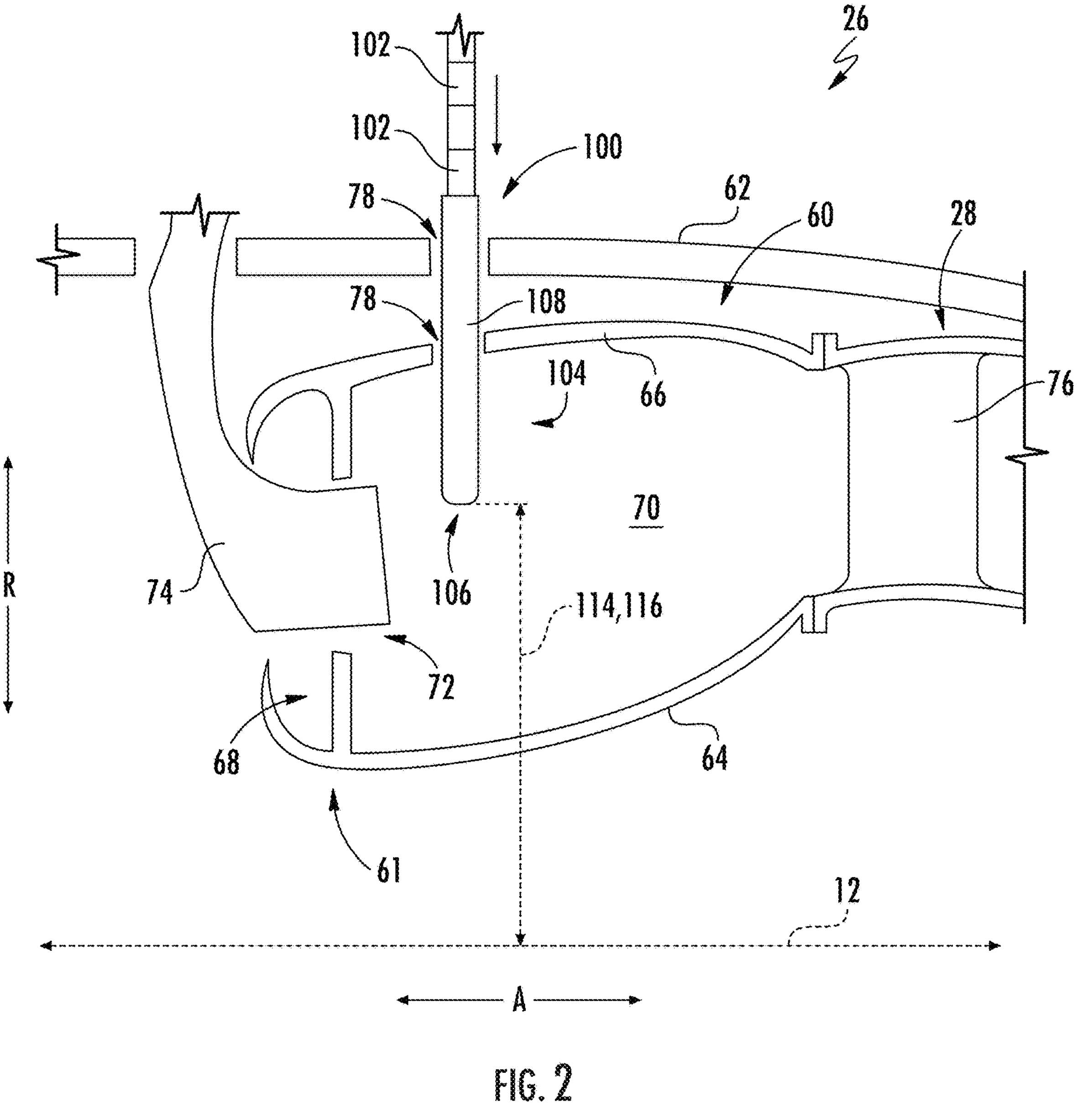
FIG. 2 is a close-up, cross-sectional view of a combustion section of the exemplary gas turbine engine of FIG. 1 including an insertion tool in accordance with an exemplary embodiment of the present disclosure, along an axial direction and a radial direction.

Referring now to FIG. 2, a close-up, schematic view of the combustion section 26 of the turbomachine 16 of the exemplary gas turbine engine 10 of FIG. 1 is provided.

As is depicted, the combustion section 26 generally includes a combustor 60 positioned within a combustor casing 62. Additionally, the combustor 60 includes an inner liner 64, an outer liner 66, and a dome 68 together defining at least in part a combustion chamber 70. It will be appreciated that the dome 68, for the embodiment depicted, is an annular dome and the combustor 60 is configured as an annular combustor. In such a manner, the combustion chamber 70 generally defines an annular shape. At a forward end 61, the combustor 60 defines, or rather, the dome 68 defines, a nozzle opening 72, and the combustion section 26 further includes a fuel-air mixer 74, or nozzle, positioned within the nozzle opening 72. The fuel-air mixer 74 is configured to provide a mixture of fuel and compressed air to the combustion chamber 70 during operation of the turbofan engine 10 to generate combustion gases. The combustion gases flow from the combustion chamber 70 to the HP turbine 28, and more specifically, through a plurality of inlet guide vanes 76 of the HP turbine 28.

Notably, although a single nozzle opening 72 and fuel-air mixer 74 is depicted in FIG. 2, the combustor 60 may further include a plurality of circumferentially spaced nozzle openings 72 and a respective plurality of fuel-air mixers 74 positioned within the nozzle openings 72.

In order to initiate a combustion of the fuel and compressed air provided to the combustion chamber 70 by the fuel-air mixer 74, the combustion section 26 typically includes an igniter (not installed or depicted) extending through one or more igniter openings 78 defined in the combustor casing 62 and the outer liner 66 of the combustor 60. However, when the turbofan engine 10 is not operating, the igniter may be removed and the igniter openings 78 may be utilized for inspecting, e.g., the combustion chamber 70, inlet guide vanes 76 of the HP turbine 28, and/or other components.

Figure 3:
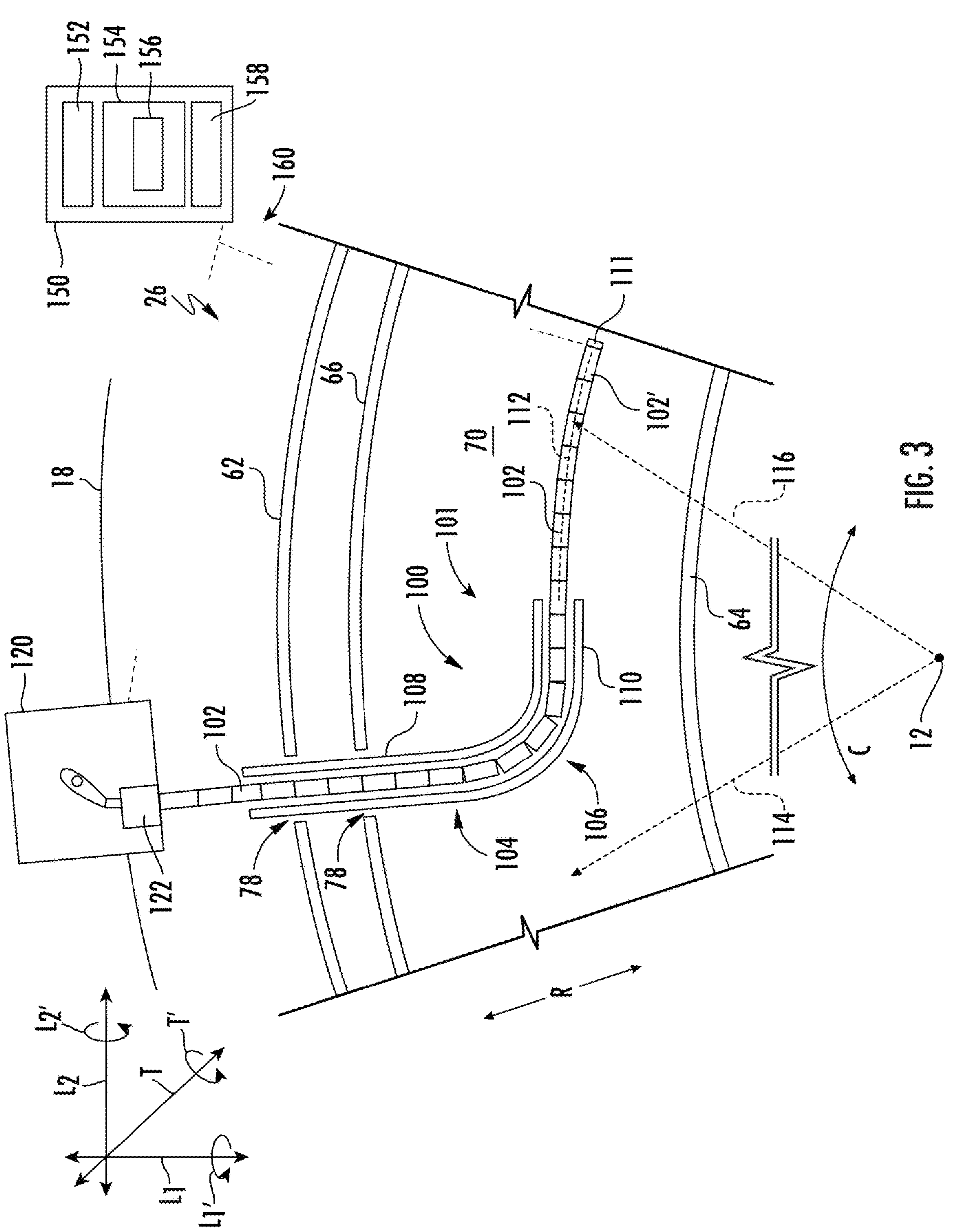
FIG. 3 is another close-up, cross-sectional view of the combustion section of the exemplary gas turbine engine of FIG. 1 including the exemplary insertion tool, along the radial direction and a circumferential direction.

More specifically, for the embodiment of FIG. 2, an insertion tool for inserting one or more implements into an interior of an engine in accordance with an exemplary embodiment of the present disclosure is depicted. In particular, for the embodiment shown, the insertion tool is a tool 100 for inspecting an annular section of an engine in accordance with an exemplary embodiment of the present disclosure, and is depicted extending through the pair of igniter openings 78 defined in the combustor casing 62 and the outer liner 66 of the combustor 60. Referring now also to FIG. 3, providing a partial, axial cross-sectional view of the combustion section 26 of FIG. 2, it will be appreciated that the tool 100 generally includes an insertion tool arm 101 formed generally of a plurality of segments 102 and an insertion tube 104, with the plurality of segments 102 of the insertion tool arm 101 movable through the insertion tube 104 into the combustion chamber 70.

More specifically, for the exemplary embodiment depicted, the insertion tube 104 includes a bend 106. In at least certain embodiments, the bend 106 may be a substantially 90 degree bend, or may be larger or smaller than 90 degrees. For example, the insertion tube 104 includes a radial portion 108 extending substantially along the radial direction R and a circumferential portion 110 extending substantially along the circumferential direction C. The radial portion 108 and circumferential portion 110 are joined at the bend 106. The plurality of segments 102 are fed through the radial portion 108, pivot in a first angular direction relative to one another to go through the bend 106, and then pivot in a second, opposite angular direction relative to one another and couple to one another such that they are configured to be in a fixed position relative to one another as they move through to the circumferential portion 110. From the circumferential portion 110, the segments 102 extend through the annular combustion chamber 70. As used herein, the term "configured to be fixed position relative to one another" means that the segments 102 are not configured to appreciable bend or deflect at joints between adjacent segments 102 during anticipated operations of the tool 100, with the exception of the actual insertion operation. In such a manner, it will be appreciated that the segments 102 may be biased towards the fixed position with a sufficient biasing force to hold the segments in place during anticipated operations of the tool 100, but may allow for some deflection in the event the tool 100, e.g., encounters an object in the environment, or is being inserted or removed from the environment.

As will be described in greater detail below, the tool 100 further includes an insertion tool arm position sensor, or simply position sensor 111, positioned proximate a distal end of the insertion tool arm 101. Specifically, for the embodiment shown, the position sensor 111 is positioned at a forward-most segment 102' of the plurality of segments 102 of the insertion tool arm 101. In at least certain exemplary embodiments, the position sensor 111 may include one or more cameras. For example, as will be described in greater detail below, the one or more cameras may include two or more sensors providing stereo feedback data (e.g., information from two separate locations which may be combined to provide relatively accurate distance/positioning data). Further for example, the position sensor 11 may include a camera, such that the position sensor 111 may further function as an implement for inspecting the interior of the engine. For example, the camera may additionally or alternatively provide a video feed for inspecting one or more components of the engine, such as for inspecting various components of the combustor 60 and/or high pressure turbine 28. It will further be appreciated that the insertion tool arm 101 may additionally or alternatively include any other suitable position sensor 111 for sensing data indicative of a position of the insertion tool arm 101 within the cavity.

As will be described in more detail below, the plurality of segments 102 of the tool 100 extending through the annular combustion chamber 70 together define an average arc shape 112 (i.e., an average arc line). Additionally, the annular combustion chamber 70 defines inspection radius 114, the inspection radius 114 being a distance along the radial direction R from which it is desired to view the annular section, i.e., annular combustion chamber 70, of the turbofan engine 10. For example, the inspection radius 114 may be a radial midpoint within the combustion chamber 70. Also, for the embodiment depicted, the average arc shape 112 of the plurality of segments 102 extending through the annular combustion chamber 70 (i.e., the plurality of segments 102 coupled to one another within the combustion chamber 70) defines a segment 102 radius 116 (or "radius of curvature"). In certain exemplary embodiments, the segment 102 radius 116 of the average arc shape 112 may not be substantially equal to the inspection radius 114, in which case the insertion tool arm 101 may be moved along various degrees of freedom from a base 120 located outside the interior of the gas turbine engine. Such operation will be described in more detail below.

Notably, the radius of curvature/segment 102 radius 116 refers to the radius of a circle that aligns with the average arc shape 112 of the plurality of segments 102 extending through the annulus of the engine 10, which is the annular combustion chamber 70 for the embodiment depicted.

Accordingly, it will be appreciated that although the tool 100 is depicted in FIGS. 2 and 3 as being used to inspect the combustion chamber 70, in other exemplary embodiments, the tool 100 may additionally, or alternatively, be used to inspect other areas of the turbofan engine 10 having different inspection radii 114. For example, the tool 100 may be utilized to inspect annular sections of the compressor section or the turbine section, or alternatively still, other engines or systems altogether.

In at least certain exemplary embodiments, the various segments 102 of the insertion tool arm 101 may be configured in a similar manner to the segments 102 of the tool described in U.S. Patent Application No. 2019/0360794, filed May 23, 2018, entitled "INSPECTION TOOL AND METHOD," with Andrew Crispin Graham listed as the lead inventor, and such reference is hereby incorporated fully herein by reference. In such a manner, it will be appreciated that in certain exemplary embodiments, the plurality of segments 102 may include adjustment members for changing an average arc shape 112 of the plurality of segments 102 (either beforehand, or in response to sensed real-time data). Alternatively, however, in other exemplary embodiments the segments 102 of the insertion tool arm 101 may be configured in any other suitable manner. For example, in other embodiments, the segments 102 may not be adjustable, such that they only have one geometry when moved to a fixed position within the interior of the engine. Additionally, or alternatively, less than all of the segments 102 may be adjustable, or one or more of the segments 102 may be adjustable in any other suitable manner.

Referring now particularly to FIG. 3, as briefly noted above, it will further be appreciated that the insertion tool further includes a base 120 coupled to the insertion tool arm 101 and in communication with the position sensor 111. The base 120 is positioned outside the cavity and is configured to move the insertion tool arm 101 along at least one degree of freedom in response to data received from the position sensor 111.

In particular, for the exemplary embodiment of FIG. 3, the base 120 is mounted to an outer casing 18 of the engine surrounding the combustion section 26 of the engine. As will be explained in more detail below with reference to the embodiment of FIGS. 4 and 5, the base 120 may provide for movement of the insertion tool arm 101 along at least two degrees of freedom, such as along at least four degrees of freedom, such as along at least six degrees of freedom. For reference, the various degrees of freedom in which the base 120 may move the insertion tool arm 101 are depicted in FIG. 3 as a longitudinal direction L1, a lateral direction L2, a transverse direction T, an orientation about the longitudinal direction L1', an orientation about the lateral direction L2', and an orientation about the transverse direction T'.

Moreover, the tool 100 further includes a controller 150. The controller 150 has one or more processors 152 and memory 154. The memory 154 stores data 156. The data 156 may include instructions that, when executed by the one or more processors 152, cause the tool 100 to perform certain functions. One or more the functions may be one or more of the functions described below with reference to, e.g., the exemplary method 200. Additionally, the controller 150 includes a network interface 158. The network interface 158 may utilize any suitable wired or wireless communications network 160 to communicate with other components of the tool 100 and/or other components.

As is depicted in phantom in FIG. 3, the controller 150 is operably coupled to both the position sensor 111 and the base 120. In such a manner, the base 120 may receive data indicative of a position of the plurality of segments 102 of the insertion tool arm 101 within the cavity (i.e., the combustion chamber 70 for the embodiment shown), data indicative of a desired position of the insertion tool arm 101 within the cavity (e.g., a desired position of the forward-most segment 102' and/or sensor 111 within the cavity), and control the insertion tool arm 101 to move the insertion tool arm 101 to the desired position within the cavity while avoiding a collision with a component defining at least in part the cavity. As used herein, the term "collision" refers to any unwanted contact between the insertion tool arm 101 and the component.

In such a manner, it will be appreciated that the controller 150 may be operable with the base 120 to facilitate movement of the insertion tool arm 101, sensor 111, or both within the cavity of the engine, such as within the combustion chamber 70 of the engine to move the insertion tool arm 101, sensor 111, or both to the desired location within the cavity of the engine. The controller 150 may operate on a feedback loop based on data sensed with the sensor 111.

Further, the base 120 may be configured to control a length of the insertion tool arm 101 within the cavity. In such a manner, the exemplary base 120 depicted includes a feeding mechanism 122 configured to move the plurality of segments 102 through the insertion tube 104 and into the annular combustion chamber 70. The feeding mechanism 122 is also in communication with the controller 150 through the network 160. In certain embodiments, the feeding mechanism 122 may use a rotating wheel having a gripper surface (such as an elastomeric surface, or a geared surface corresponding to a geared surface of the segments 102) to feed the segments 102 into the insertion tube 104.

Moreover, although not depicted, the insertion tool 100 may include any suitable implements for performing one or more maintenance, repair, or inspection operations within the interior of the engine. For example, in certain exemplary embodiments, as noted above, the position sensor 111 may include one or more cameras for inspecting the interior of the engine. Additionally, or alternatively, the insertion tool arm 101 may include one or more implements, such as one or more of a drill, heater, welder, etc., to perform a maintenance and/or repair operation in which material is added to a component of the engine, material is removed from a component of the engine, or a physical property of a component of the engine is changed.

Figure 4:
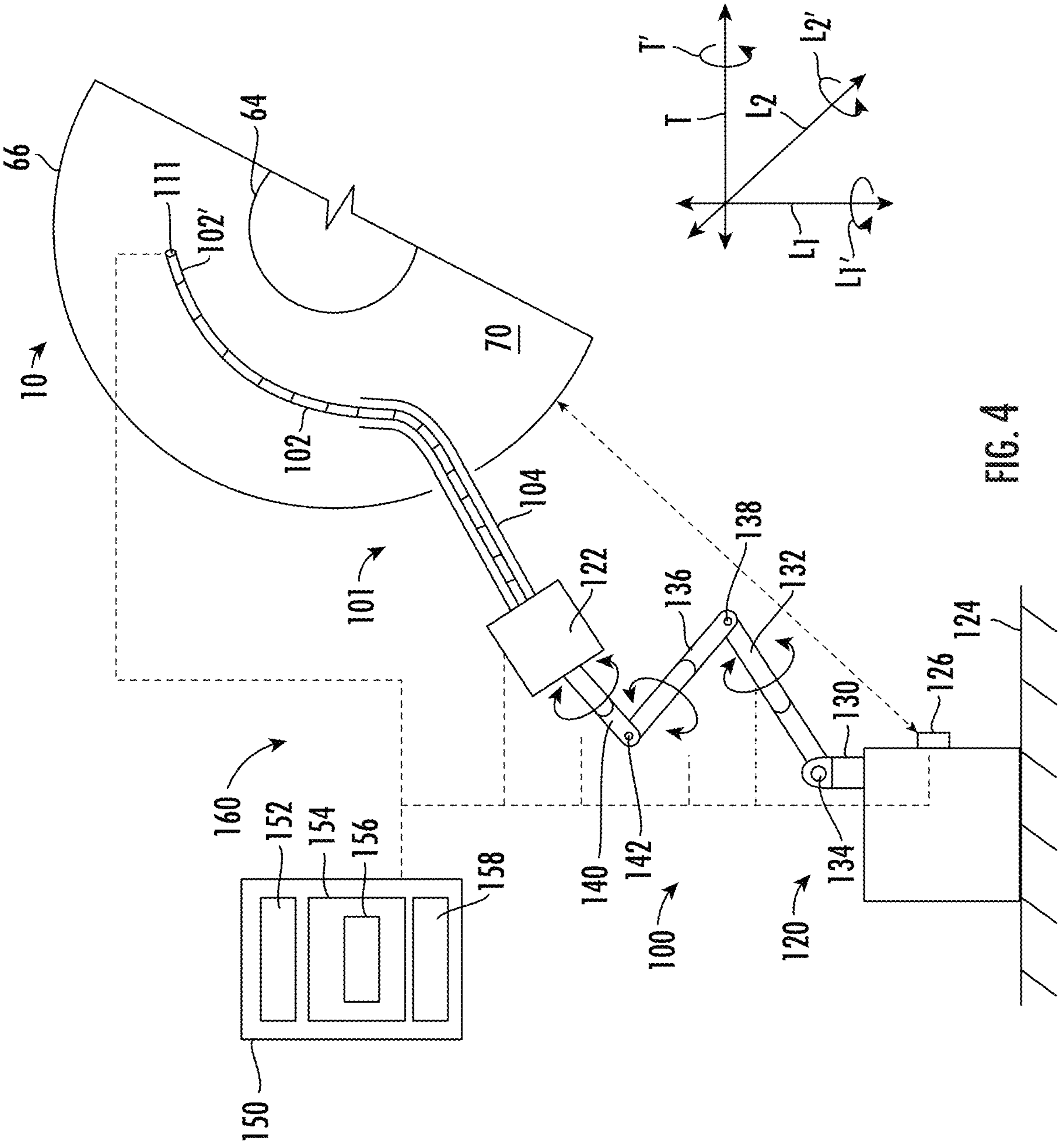
FIG. 4 is a close-up view of an insertion tool in accordance with another exemplary embodiment of the present disclosure in a first position.
Figure 5:
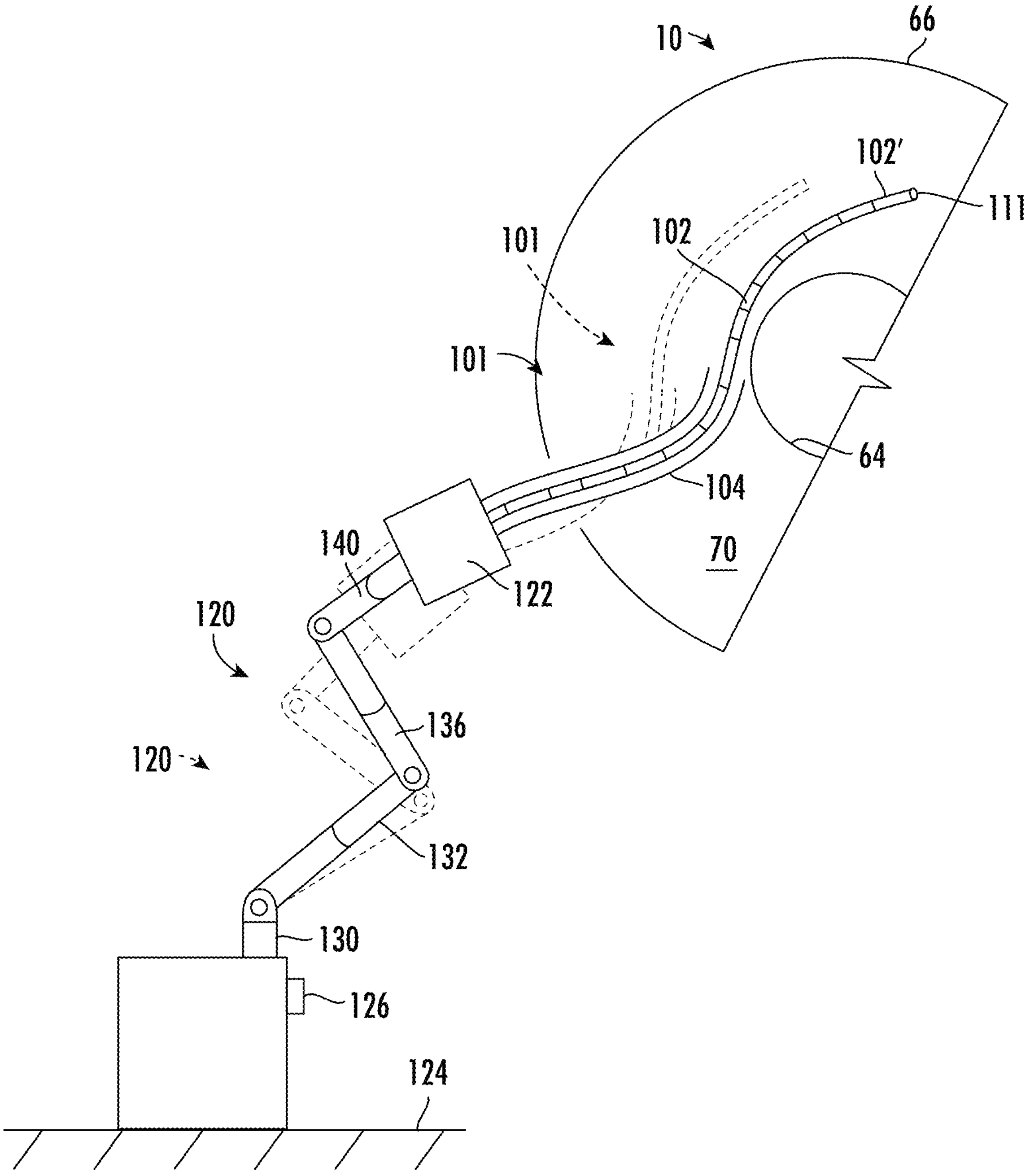
FIG. 5 is a close-up view of the exemplary insertion tool of FIG. 4 in a second position.

Referring now to FIGS. 4 and 5, an insertion tool 100 for an engine 10 in accordance with another exemplary embodiment of the present disclosure is provided. The exemplary insertion tool 100 of FIGS. 4 and 5 may be configured in substantially the same manner as exemplary insertion tool 100 described above with reference to FIGS. 2 and 3, and further, may be operable with a gas turbine engine 10 in accordance with one or more of the exemplary embodiments described above with reference to FIGS. 1 through 3. For example, the engine 10 may be a gas turbine engine 10 defining an access opening and including a component defining at least in part a cavity. For the embodiment shown, the access port is an igniter port 78 or borescope port, and the component is a combustion chamber liner 64, 66, a combustor dome 68, a fuel nozzle 74, or a combination thereof. Accordingly, it will be appreciated that for the embodiment shown, the cavity is a combustion chamber 70 of the engine 10.

Further, as with the exemplary insertion tool 100 described above with reference to FIGS. 2 and 3, the exemplary insertion tool 100 of FIGS. 4 and 5 generally includes insertion tool arm 101 and a base 120, the insertion tool arm 101 having a plurality of segments 102 and a position sensor 111. For the embodiment shown, the position sensor 111 is positioned proximate a distal end of the insertion tool arm 101, and more specifically, is positioned at a forward-most segment 102' of the plurality of segments 102 of the insertion tool arm 101.

However, for the embodiment shown, the base 120 of the insertion tool 100 is configured to be mounted at a location separate from the engine 10, and more specifically, from the base 120 of the insertion tool 100 is configured to be mounted to a ground location 124. The term "ground location" refers generically to any location separate from the engine 10 or a structure on which the engine 10 is mounted (such as an aircraft). For example, the ground location may be, e.g., the actual ground beneath the engine 10, a stand or cart separate from the engine 10 positioned proximate the engine 10, etc.

In order to accommodate any relative movement between the engine 10 and the ground location 124, the insertion tool 100 further includes a second position sensor 126 configured to sense data indicative of a location of one or more aspects of the insertion tool 100 outside of the interior of the engine 10, relative to the engine 10. Specifically, for the embodiment shown, the second position sensor 126 is included with the base 120 and is configured to sense data indicative of a location of the base 120 relative to the engine 10 (such as data indicative of relative distance and/or orientation). In certain exemplary embodiments, the insertion tool 100 may include one or more of the features discussed in U.S. application Ser. No. 16/008,475, filed Jan. 14, 2018, which is incorporated herein in its entirety for all purposes.

As noted with the embodiment of FIGS. 2 and 3, the base 120 of the exemplary embodiment of FIGS. 4 and 5 is coupled to the insertion tool arm 101 and is in communication with the position sensor 111 of the insertion tool arm 101. The base 120 is configured to move insertion tool arm 101 along at least two degrees of freedom in response to data received from the position sensor 111. More specifically, for the embodiment shown, the base 120 is configured to move insertion tool arm 101 along at least four degrees of freedom at least in part in response to data received from the position sensor 111. More specifically, still, the base 120 is configured to move insertion tool arm 101 along at least six degrees of freedom, plus one degree of freedom from changing a length of the insertion tool arm 101 using the feeding mechanism 122, at least in part in response to data received from the position sensor 111.

For the embodiment shown, the degrees of freedom in which the base 120 is configured to move the insertion tool arm 101 includes one or more of the following: a longitudinal direction L1, a lateral direction L2, a transverse direction T, an orientation about longitudinal direction L1', an orientation about the lateral direction L2', and an orientation about the transverse direction T'. In order to effectuate such movement along these degrees of freedom, exemplary base 120 depicted includes a plurality of members pivotably coupled to one another about respective pivot points. In particular, for the embodiment shown, the base 120 includes a first member 130 pivotably coupled to a second member 132 about a first pivot point 134, the second member 132 pivotally coupled to a third member 136 about a second pivot point 138, and the third member 136 pivotally coupled to a fourth member 140 about a third pivot point 142.

Further, for the embodiment shown, one or more of these members 130, 132, 136, 140 may allow for rotation about a length thereof. Specifically, the embodiment shown, the first member 130 allows for rotation about a length of the first member 130, the second member 132 allows for rotation about a length of the second member 132, the third member 136 similarly allows for rotation about a length of the third member 136, and the fourth member 140 allows for rotation about a length of the fourth member 140. These respective directions of rotation are depicted with arrows, which are not labeled for clarity.

In certain exemplary embodiments, the base 120 may include one or more electric motors operable with the members 130, 132, 136, 140 and/or pivot points 134, 138, 142 to provide for the relative movement and rotation.

It will be appreciated, however, that in other exemplary embodiments, the base 120 may have any other suitable configuration for providing the movement of the insertion tool arm 101 along the desired degrees of freedom. For example, in other exemplary embodiments, the base 102 may include a pair of linear actuators to only move the insertion tool arm 101 along the transverse direction T and longitudinal direction L1. Other configurations are contemplated as well.

In such manner, the insertion tool arm 101 may be moved by the base 120 (e.g., at the direction of the controller 150) to substantially any desired position and/or orientation within the cavity of the engine 10.

Notably, such may be beneficial in order to allow for the insertion tool arm 101 to navigate through annular spaces within the same engine 10, or different engines 10, having different radii of curvatures 114. For example, although the insertion tool arm 101 made define a radius of curvature 114 different than that of the annular space through which it is being inserted, the capability of maneuvering the insertion tool arm 101 to various positions and orientations along the particular degrees of freedom may nonetheless allow for the insertion tool arm 101 to navigate through such annular space without collision.

Further, it will be appreciated that the ability to move in the various degrees of freedom may facilitate the use of the insertion tool arm 101 in the various annular geometries (having, e.g., various radii of curvature 114) despite the constraint on the movement of the insertion tool arm 101 provided by the fixed position of the access opening of the engine 10 through which the insertion tool arm 101 is inserted. As will be appreciated from the discussion herein, the ability to move in the various degrees of freedom may facilitate the use of the insertion tool arm 101 in the various annular geometries while maintaining a desired clearance with the component(s) defining the access opening. For example, the insertion tool 100 may be able to move the insertion tool arm 101 inward and outward of the access opening, while pivoting the insertion tool arm 101 at the access opening, and/or changing an orientation of the insertion tool arm 101, to position, e.g., the sensor 111 at a desired location within the cavity (combustion chamber 70 or other annular space within the engine 10) without colliding with any components.

For example, referring now also to FIG. 5, it will be appreciated that the distal end of the insertion tool arm 101 is moved from a first location (FIG. 4; depicted in phantom in FIG. 5) to a second location (FIG. 5). As part of such movement, the insertion tool arm 101 is moved along the longitudinal direction L1 and along the lateral direction L2, and is also changed in orientation about the transverse direction T. Notably, such movement of the insertion tool arm 101 is made while maintaining a clearance with the component(s) defining the access opening, and includes pivoting the insertion tool arm 101 at the access opening. Such may facilitate the movement of the distal end of the insertion tool arm 101 from the first location to the second location, despite any mismatch between the radii of curvature of insertion tool arm 101 and the cavity of the engine 10.

Figure 6:
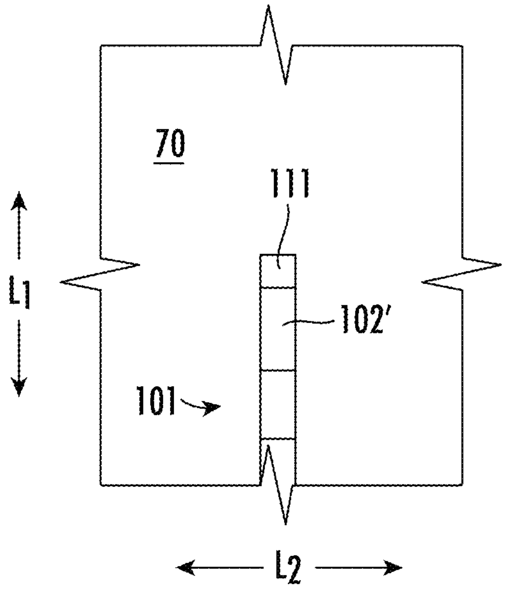
FIG. 6 is a radial view of the exemplary insertion tool of FIG. 4 in the first position.
Figure 7:
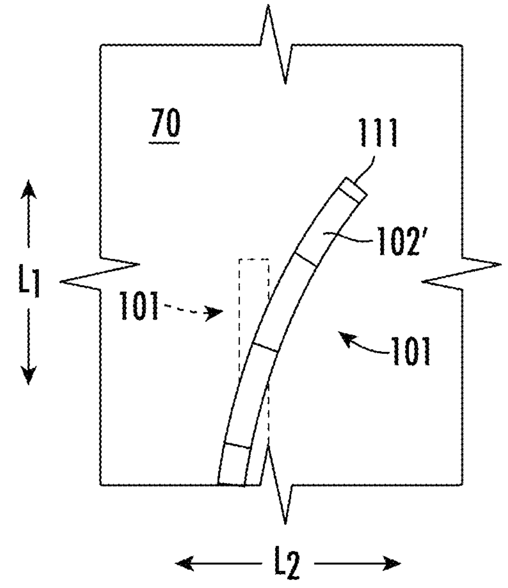
FIG. 7 is a radial view of the exemplary insertion tool of FIG. 4 in the second position.

Further, it will be appreciated that the ability to move the insertion tool arm 101 about the various degrees of freedom may also allow for the distal end of the insertion tool arm 101 to be positioned at various location along a length of the engine. For example, referring briefly to FIGS. 6 and 7, each providing an outward-looking-in along a radial direction of the engine 10 view of the insertion tool arm 101 of FIGS. 4 and 5, respectively, it will be appreciated that changing an orientation of the insertion arm tool 101 about one or more of the degrees of freedom may allow for the distal end of the insertion tool arm 101 to further be positioned at various directions along a length of the engine (e.g., along the axial direction A of the engine of FIG. 1, shown as the lateral direction L2 in FIGS. 6 and 7).

It will be appreciated, however, in other embodiments, in addition to movement of the insertion tool arm 101 by the base 120, the base 120 may further increase or decrease a length of the insertion tool arm 101 within the cavity by adding or removing segments 102 within the cavity. Accordingly, there may be a variety of potential manners in which to move the distal end of the insertion tool arm 101 from the first location the second location. The insertion tool 100 may utilize any method that provides for a lowest risk of collision, or alternatively meets some other design objective.

It will further be appreciated that the exemplary insertion tool 100 and base 102 are provided by way of example only. In other exemplary embodiments, the insertion tool 100 and base 102 may have any other suitable configuration. For example, in certain exemplary embodiments the base 102 may not include each of the features providing the various degrees of freedom discussed with respect to FIGS. 4 and 5. For example, although FIG. 4 depicts seven degrees of freedom, one or more of the members 132, 136, 140 may not allow for rotation about a length thereof, and/or the base 102 may not include each of the members 132, 136, 140.

Moreover, it will be appreciated that although the exemplary insertion tool 100 described above includes the position sensor 111 on the insertion tool arm 101, and the base 102 is configured to move the insertion tool arm 101 in response to data received from the position sensor 111 on the insertion tool arm 101, in other embodiments, other configurations are contemplated. For example, in other exemplary embodiments, the position sensor 111 may be separate from the insertion tool arm 101 and, e.g., inserted through a separate access port of the engine. Additionally, or alternatively, the base 102 may be configured to be operated manually to move the insertion tool arm 101 along the various degrees of freedom in response to sensed data from, e.g., the position sensor 111, or in response to a user's or operator's visual inspection of the location of the insertion arm tool 101 within the cavity of the engine.

Figure 8:
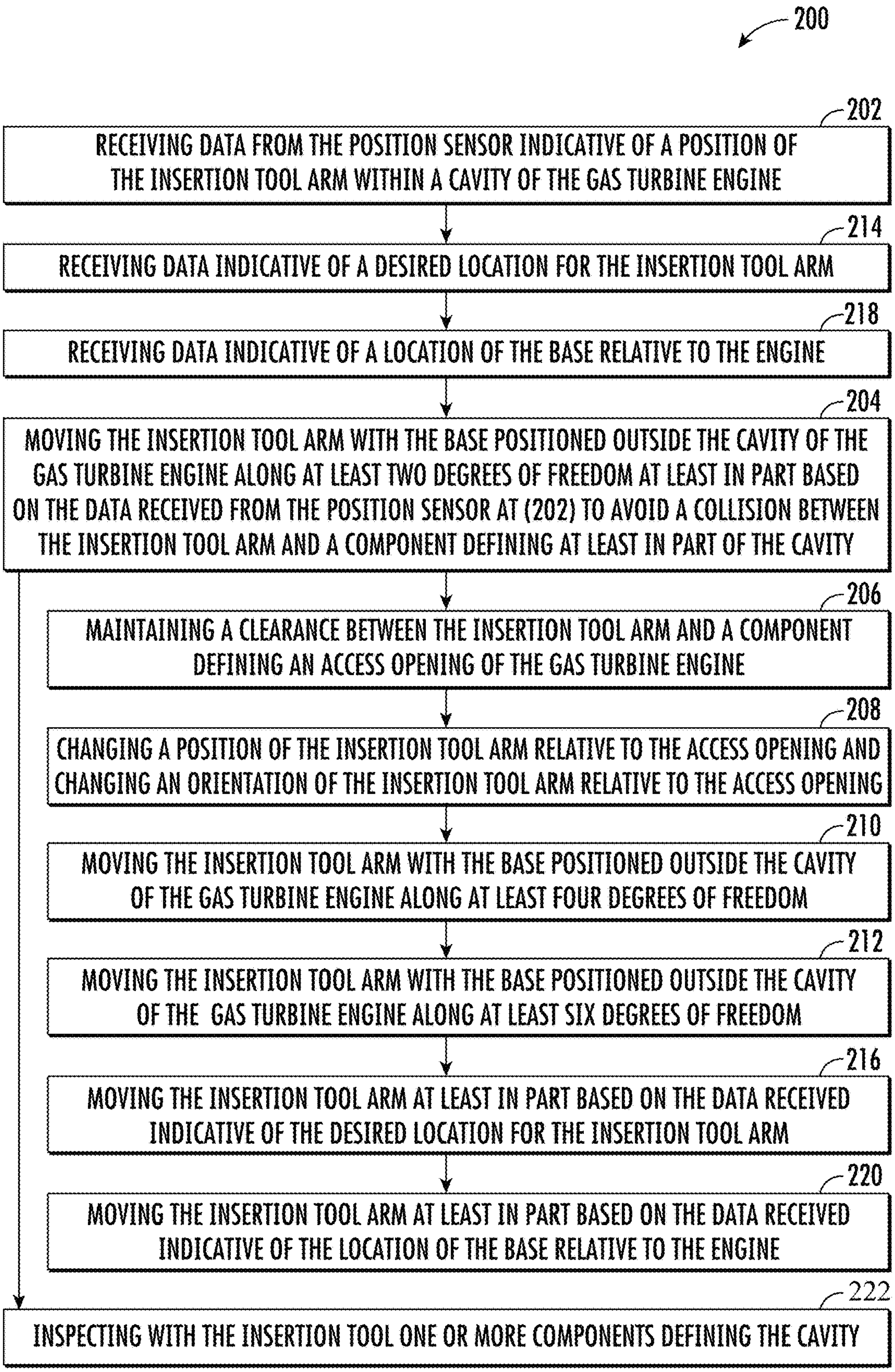
FIG. 8 is a flow diagram of a method for inserting a tool into an interior of an engine in accordance with an exemplary aspect of the present disclosure.

Referring now to FIG. 8, a method 200 of inserting an insertion tool into a cavity of a gas turbine engine is provided. In certain exemplary aspects, the insertion tool includes an insertion tool arm having a position sensor and a base coupled to the insertion tool arm. For example, in certain exemplary aspects, the method 200 may utilize one or more the exemplary insertion tools described above with reference to FIGS. 1 through 7.

The method 200 includes at (202) receiving data from the position sensor indicative of a position of the insertion tool arm within a cavity of the gas turbine engine. The data may be image data from, e.g., one or more cameras, distance data from one or more distance sensors, etc. Further, the data may be 1-dimensional distance data, or may be 2-dimensional data, or may be 3-dimensional data. For example, the data may be image data received from at least two cameras, such that 3-dimensional distance data may be determined for the environment.

The method 200 further includes at (204) moving the insertion tool arm with the base positioned outside the cavity of the gas turbine engine along at least two degrees of freedom at least in part based on the data received from the position sensor at (202) to avoid a collision between the insertion tool arm and a component defining at least in part the cavity.

In certain exemplary aspects, moving the insertion tool arm along at least two degrees of freedom at (204) includes at (206) maintaining a clearance between the insertion tool arm and a component defining an access opening of the gas turbine engine. For example, in the exemplary aspect depicted, moving the insertion tool arm along at least two degrees of freedom at (204) includes at (208) changing a position of the insertion tool arm relative to the access opening and changing an orientation of the insertion tool arm relative to the access opening. In such a manner, it will be appreciated that movement of the insertion tool arm is constrained by the size and position of the access opening. Thus, the method 200 may ensure this constraint is properly accounted for when moving the insertion tool arm at (204).

Moreover, it will be appreciated that for the exemplary method 200 depicted, moving the insertion tool arm with the base positioned outside the cavity of the gas turbine engine along at least two degrees of freedom at (204) further includes at (210) moving the insertion tool arm with the base positioned outside the cavity of the gas turbine engine along at least four degrees of freedom, and more specifically includes at (212) moving the insertion tool arm with the base positioned outside the cavity of the gas turbine engine along at least six degrees of freedom.

Further, it will be appreciated that in addition to moving the insertion tool arm based on the feedback from the position sensor, the method 200 may additionally move the insertion tool arm based on other mission goals, such as to inspect a particular component, make a particular repair, etc. Specifically, for the exemplary aspect depicted, the method 200 additionally includes at (214) receiving data indicative of a desired location for the insertion tool arm. The data received at (214) may be coordinate data of a location within the cavity, and may further include orientation data for such a location. Additionally, the data received at (214) may include a series of coordinates and corresponding orientations. With such an exemplary aspect, moving the insertion tool arm with the base positioned outside the cavity of the gas turbine engine at least in part based on the data received from the position sensor at (204) further includes at (216) moving the insertion tool arm at least in part based on the data received indicative of the desired location for the insertion tool arm. Such may enable the method 200 to achieve certain missions.

In such a manner, it will be appreciated that for the exemplary aspect shown, the method 200 further includes at (218) inspecting with the insertion tool one or more components defining the cavity. Inspecting the one or more components at (218) may include receiving images from a sensor, such as a camera being used as the position sensor, a separate sensor, or both. The images may be analyzed by a controller to determine, e.g., a condition of the one or more components, and/or one or more aspects of the one or more components.

Although not depicted, the method 200 may additionally or alternatively be capable of performing other functions. For example, in other exemplary aspects, the insertion tool may include one or more additional tool implements (e.g., drill, welder, fluid nozzle, etc.). In such a case, the method 200 may include performing one or more repair operations.

Furthermore, it will be appreciated that in certain exemplary aspects, the base may not be fixed to the engine. With such an exemplary aspect, the method 200 may further include at (222) receiving data indicative of a location of the base relative to the engine. With such an exemplary aspect, moving the insertion tool arm with the base positioned outside the cavity of the gas turbine engine at least in part based on the data received from the position sensor at (204) may further include at (220) moving the insertion tool arm at least in part based on the data received indicative of the location of the base relative to the engine.

It will be appreciated, however, that in other exemplary aspects, the method 200 may be configured in any other suitable manner to perform any other suitable steps, and the that the process described above is by way of example only.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

An insertion tool for an engine defining an access opening and comprising a component defining at least in part a cavity, the insertion tool comprising: an insertion tool arm comprising a plurality of segments, the insertion tool arm configured for insertion through the access opening into the cavity and the plurality of segments configured to be in a fixed position relative to one another within the cavity; and a base coupled to the insertion tool arm and configured to be positioned outside the cavity and to move the insertion tool arm along at least two degrees of freedom.

The insertion tool of one or more of these clauses, wherein the insertion tool arm further comprises a position sensor configured to sense a location of the insertion tool arm within the cavity, and wherein the base is configured to move the insertion tool arm along at least two degrees of freedom in response to data received from the position sensor.

The insertion tool of one or more of these clauses, wherein the base is configured to move the insertion tool arm along at least four degrees of freedom at least in part in response to data received from the position sensor.

The insertion tool of one or more of these clauses, wherein the base is configured to move the insertion tool arm along at least six degrees of freedom at least in part in response to data received from the position sensor.

The insertion tool of one or more of these clauses, further comprising: a controller operably coupled to the position sensor and the base for receiving data from the position sensor and providing control decisions to the base in response to the data received from the position sensor.

The insertion tool of one or more of these clauses, wherein the base is configured to be mounted to the engine.

The insertion tool of one or more of these clauses, wherein the base is configured to be mounted at a location separate from the engine.

The insertion tool of one or more of these clauses, wherein the base comprises a base position sensor configured to sense data indicative of a location of the base relative to the engine, and wherein the base is further configured to move the insertion tool arm in response to data received from the base position sensor.

The insertion tool of one or more of these clauses, further comprising: an insertion tube extending at least partially through the access opening, wherein the insertion tool is configured to feed the plurality of segments of the insertion tool arm through the insertion tube into the cavity, and wherein the plurality of segments of the insertion tool arm are in the fixed position within the cavity relative to each other.

The insertion tool of one or more of these clauses, wherein the base is further configured to change a length of the insertion tool arm within the cavity in response to data received from the position sensor.

The insertion tool of one or more of these clauses, wherein the access port is an ignitor port or a borescope port, wherein the component is a combustor liner, a combustor dome, a combustion nozzle, or a combination thereof, and wherein the cavity is a combustion chamber.

A method of inserting an insertion tool into a cavity of a gas turbine engine, the insertion tool comprising an insertion tool arm having a position sensor and a base coupled to the insertion tool arm, the method comprising: receiving data from the position sensor indicative of a position of the insertion tool arm within a cavity of the gas turbine engine; and moving the insertion tool arm with the base positioned outside the cavity of the gas turbine engine along at least two degrees of freedom at least in part based on the data received from the position sensor to avoid a collision between the insertion tool arm and a component defining at least in part the cavity.

The method of one or more of these clauses, wherein moving the insertion tool arm along at least two degrees of freedom comprises maintaining a clearance between the insertion tool arm and a component defining an access opening of the gas turbine engine.

The method of one or more of these clauses, wherein moving the insertion tool arm along at least two degrees of freedom comprises changing a position of the insertion tool arm relative to the access opening and changing an orientation of the insertion tool arm relative to the access opening.

The method of one or more of these clauses, further comprising: receiving data indicative of a desired location for the insertion tool arm; wherein moving the insertion tool arm with the base positioned outside the cavity of the gas turbine engine at least in part based on the data received from the position sensor comprises moving the insertion tool arm at least in part based on the data received indicative of the desired location for the insertion tool arm.

The method of one or more of these clauses, wherein moving the insertion tool arm with the base positioned outside the cavity of the gas turbine engine along at least two degrees of freedom comprises moving the insertion tool arm with the base positioned outside the cavity of the gas turbine engine along at least four degrees of freedom.

The method of one or more of these clauses, wherein moving the insertion tool arm with the base positioned outside the cavity of the gas turbine engine along at least two degrees of freedom comprises moving the insertion tool arm with the base positioned outside the cavity of the gas turbine engine along at least six degrees of freedom.

The method of one or more of these clauses, further comprising: receiving data indicative of a location of the base relative to the engine, and wherein moving the insertion tool arm with the base positioned outside the cavity of the gas turbine engine at least in part based on the data received from the position sensor comprises moving the insertion tool arm at least in part based on the data received indicative of the location of the base relative to the engine.

The method of one or more of these clauses, further comprising: performing an inspection operation, a maintenance operation, or a repair operation with the insertion tool one or more components defining the cavity.

A gas turbine engine assembly comprising: a section defining an access opening; a component defining at least in part a cavity; and an insertion tool comprising an insertion tool arm comprising a plurality of segments, the insertion tool arm configured for insertion through the access opening into the cavity and the plurality of segments configured to be in a fixed position relative to one another within the cavity; and a base coupled to the insertion tool arm and configured to be positioned outside the cavity and to move the insertion tool arm along at least two degrees of freedom.

What is claimed is:

1. A system for operating an insertion tool arm in a cavity of a gas turbine engine, the system comprising:

an insertion tool arm having a position sensor;

a base coupled to the insertion tool arm and including a plurality of members coupled together at movable joints, the base to be positioned outside a cavity of a gas turbine engine, the base having at least two degrees of freedom; and a controller operably coupled with the position sensor and the base, the controller configured to:

receive data from the position sensor, the data indicative of a position of the insertion tool arm within a cavity of the gas turbine engine; and move at least one of the plurality of members of the base to move the insertion tool arm along at least two degrees of freedom, at least in part, based on the data to avoid a collision between the insertion tool arm and a component defining the cavity by maintaining a clearance between the insertion tool arm and a component defining an access opening of the gas turbine engine or the component defining the cavity.

2. The system of claim 1, wherein the data is first data, and wherein the controller is further configured to:

receive second data indicative of a desired location for the insertion tool arm;

wherein the controller is configured to move the insertion tool arm, at least in part, based on the second data.

3. The system of claim 1, wherein the data is first data, and wherein the controller is further configured to:

receive second data indicative of a location of the base relative to the gas turbine engine;

wherein the controller is configured to move the insertion tool arm, at least in part, based on the second data.

4. The system of claim 3, wherein the position sensor is a first position sensor, and wherein the controller is configured to receive the second data from a second position sensor configured to sense the second data indicative of a location of the base relative to the gas turbine engine.

5. The system of claim 1, wherein the controller is further configured to:

perform at least one of an inspection operation, a maintenance operation, or a repair operation on at least one component defining the cavity with the insertion tool arm.

6. The system of claim 1, wherein the plurality of members are pivotably coupled to one another about respective pivot points.

7. The system of claim 1, wherein the controller is configured to move the insertion tool arm by rotating at least one of a plurality of members of the base via at least one pivot point coupling the plurality of members to each other.

8. The system of claim 1, wherein the controller is configured to move the insertion tool arm by translating at least one of a plurality of members of the base via one or more electric motors operable with the plurality of members.

9. The system of claim 1, wherein the controller is configured to move the insertion tool arm by pivoting the insertion tool arm at the access opening to maintain the clearance with the component.

10. The system of claim 1, wherein the base includes a plurality of members pivotably coupled to one another about respective pivot points, at least one of the plurality of members allowing for rotation about a length thereof.

11. The system of claim 10, wherein the plurality of members includes a first member pivotally coupled to a second member about a first pivot point.

12. The system of claim 11, wherein the plurality of members further includes a third member pivotally coupled to the second member about a second pivot point, and the third member pivotally coupled to a fourth member about a third pivot point.

13. A system for operating an insertion tool arm in a cavity of a gas turbine engine, the system comprising:

an insertion tool arm having a position sensor;

a base coupled to the insertion tool arm, the base having at least two degrees of freedom and including movable members; and a controller operably coupled with the position sensor and the base, the controller configured to:

receive first data from the position sensor, the first data indicative of a position of the insertion tool arm within a cavity of a gas turbine engine;

receive second data indicative of a relative motion between the gas turbine engine and at least one of the base or the insertion tool arm; and move the movable members of the base to move the base relative to the gas turbine engine, thereby moving the insertion tool arm along at least two degrees of freedom in response to the first data and the second data to avoid a collision between the insertion tool arm and a component defining the cavity by maintaining a clearance between the insertion tool arm and a component defining an access opening of the gas turbine engine or the component defining the cavity.

14. The system of claim 13, wherein the base has at least two degrees of freedom and is positioned outside the cavity.

15. The system of claim 13, wherein the controller is further configured to:

receive third data indicative of a desired location for the insertion tool arm;

wherein the controller is configured to move the insertion tool arm based at least in part on the third data.

16. The system of claim 15, wherein the controller is configured to move the insertion tool arm to compensate for a deviation between the position of the insertion tool arm and the desired location for the insertion tool arm.

17. The system of claim 13, wherein the base includes a pair of linear actuators.

18. The system of claim 13, wherein the controller is configured to receive the second data from an optical sensor, and wherein the second data includes data indicative of a change in an alignment of an optical transmitter of the optical sensor and an optical receiver of the optical sensor.

19. The system of claim 13, wherein the controller is configured to receive the second data from a sensor, the sensor attached to a distal end of the insertion tool arm to sense movement of the insertion tool arm relative to the base.

20. The system of claim 13, wherein the controller is configured to move the insertion tool arm by moving at least one of a plurality of members of the base, the plurality of members pivotably coupled to one another about respective pivot points or by rotating at least one of the plurality of members of the base via at least one pivot point coupling the plurality of members to each other.

* * * * *